United States Patent
Yeh

(10) Patent No.: US 9,880,742 B2
(45) Date of Patent: Jan. 30, 2018

(54) VALID DATA MERGING METHOD, MEMORY CONTROLLER AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 111 days.

(21) Appl. No.: 14/872,154

(22) Filed: Oct. 1, 2015

(65) Prior Publication Data

US 2017/0038977 A1 Feb. 9, 2017

(30) Foreign Application Priority Data

Aug. 7, 2015 (TW) .............................. 104125829 A

(51) Int. Cl.
*G06F 12/00* (2006.01)
*G06F 3/06* (2006.01)
*G06F 12/02* (2006.01)
*G06F 12/1009* (2016.01)

(52) U.S. Cl.
CPC .......... *G06F 3/0608* (2013.01); *G06F 3/0652* (2013.01); *G06F 3/0679* (2013.01); *G06F 12/0246* (2013.01); *G06F 12/1009* (2013.01); *G06F 2212/1044* (2013.01); *G06F 2212/2022* (2013.01); *G06F 2212/7201* (2013.01)

(58) Field of Classification Search
CPC .... G06F 3/0608; G06F 3/0652; G06F 3/0679; G06F 12/0246; G06F 12/1009; G06F 2212/1044; G06F 2212/2022; G06F 2212/7201

See application file for complete search history.

(56) References Cited

U.S. PATENT DOCUMENTS

| | | | |
|---|---|---|---|
| 2009/0089483 A1* | 4/2009 | Tanaka ................... | G06F 3/0608 711/103 |
| 2011/0213912 A1* | 9/2011 | Yeh ......................... | G06F 11/10 711/103 |
| 2011/0231624 A1* | 9/2011 | Fukutomi ............ | G06F 12/0246 711/162 |
| 2011/0258391 A1* | 10/2011 | Atkisson ............... | G06F 11/108 711/118 |

(Continued)

*Primary Examiner* — Charles Rones
*Assistant Examiner* — Nanci Wong
(74) *Attorney, Agent, or Firm* — JCIPRNET

(57) ABSTRACT

A valid data merging method, a memory controller and a memory storage apparatus are provided. The method includes: selecting a first physical erasing unit, and loading a first logical address-physical address mapping table according to a physical address-logical address mapping table. The method also includes: updating the first logical address-physical address mapping table according to the physical address-logical address mapping table, and identifying valid data in the first physical erasing unit according to the physical address-logical address mapping table and the first logical address-physical address mapping table. The method further includes: storing the first logical address-physical address mapping table, copying the valid data to a second physical erasing unit, and performing an erasing operation for the first physical erasing unit.

24 Claims, 21 Drawing Sheets

(56) References Cited

U.S. PATENT DOCUMENTS

| | | | |
|---|---|---|---|
| 2012/0246391 A1* | 9/2012 | Meir | G06F 12/0246 |
| | | | 711/103 |
| 2012/0284587 A1* | 11/2012 | Yu | G06F 12/0246 |
| | | | 711/103 |
| 2013/0290773 A1* | 10/2013 | Yoshihara | G06F 12/0246 |
| | | | 714/6.21 |
| 2014/0281361 A1* | 9/2014 | Park | G06F 3/0641 |
| | | | 711/206 |
| 2016/0188208 A1* | 6/2016 | Kim | G06F 3/061 |
| | | | 711/103 |

* cited by examiner

| Physical address | Logical address |
|---|---|
| 410(3)-0 | LBA(0)-2 |
| | |
| | |

| Physical erasing unit | Valid data count |
|---|---|
| 410(0) | 2 |
| 410(1) | 3 |
| 410(2) | 3 |

| Physical address | Logical address |
|---|---|
| 410(3)-0 | LBA(0)-2 |
| 410(3)-1 | LBA(1)-0 |
| | |

| Physical erasing unit | Valid data count |
|---|---|
| 410(0) | 2 |
| 410(1) | 2 |
| 410(2) | 3 |

| Physical address | Logical address |
|---|---|
| 410(3)-0 | LBA(0)-2 |
| 410(3)-1 | LBA(1)-0 |
| 410(3)-2 | LBA(1)-1 |

FIG. 11B

| Physical erasing unit | Valid data count |
|---|---|
| 410(0) | 2 |
| 410(1) | 1 |
| 410(2) | 3 |

FIG. 11C

| Physical address | Logical address |
|---|---|
| 410(3)-0 | LBA(0)-2 |
| 410(3)-1 | LBA(1)-0 |
| 410(3)-2 | LBA(1)-1 |

| Physical erasing unit | Valid data count |
|---|---|
| 410(0) | 2 |
| 410(1) | 1 |
| 410(2) | 3 |

| Physical address | Logical address |
|---|---|
|  |  |
|  |  |
|  |  |

| Physical erasing unit | Valid data count |
|---|---|
| 410(0) | 2 |
| 410(3) | 3 |
| 410(2) | 3 |

VALID DATA MERGING METHOD, MEMORY CONTROLLER AND MEMORY STORAGE APPARATUS

CROSS-REFERENCE TO RELATED APPLICATION

This application claims the priority benefit of Taiwan application serial no. 104125829, filed on Aug. 7, 2015. The entirety of the above-mentioned patent application is hereby incorporated by reference herein and made a part of this specification.

BACKGROUND

Technical Field

The present invention relates to a valid data merging method for a non-volatile memory module and a memory controller and a memory storage apparatus using the same.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory as its storage medium. For these reasons, the flash memory has become an import part of the electronic industries.

A flash memory storage module includes a plurality of physical erasing units, and each of the physical erasing units has a plurality of physical programming units, and a data is written into the physical erasing unit according to a sequence of the physical programming units. In addition, the physical programming units already written with data must be erased before it can be used again for writing data. In particular, the physical erasing unit is served as a smallest unit for erasing, whereas the physical programming unit is served as a smallest unit for programming (or writing). Therefore, in a management of the flash memory module, the physical erasing units may be divided into a data area and a spare area.

The physical erasing units of the data area are configured to store data stored by a host system. More specifically, a memory management circuit in the memory storage apparatus converts logical access addresses to be accessed by the host system into logical pages of logical blocks, and maps the logical pages of the logical blocks to the physical programming units of the physical erasing units of the data area. Namely, in the management of the flash memory module, the physical erasing units of the data area are regarded as the physical erasing units already being used (e.g., already stored with data written by the host system). For example, the memory management circuit uses a logical address-physical address mapping table for recording mapping relations between the logical pages and the physical programming units in the data area.

The physical erasing units of the spare area are used to alternatively replace the physical erasing units in the data area. More specifically, as described above, the physical erasing units written with data must be erased before it can be used again for writing data. Therefore, the physical erasing units of the spare area are designed to replace the physical erasing units mapped to the logical blocks for writing update data. Accordingly, the physical erasing units in the spare area are empty or the physical erasing units that can be used for writing data.

In a common writing operation, after the data is written into the physical erasing units in the spare area, the memory management circuit in the memory storage apparatus does not immediately change the mapping relations between the logical pages and the physical programming units in the logical address-physical address mapping table, but stores mapping information corresponding to the writing operation by using a physical address-logical address mapping table stored in a buffer memory. Specifically, in the writing operation, the memory management circuit writes the update data into one physical erasing unit (also known as an active physical erasing unit) in the spare area, and records the mapping information between the logical pages related to such writing operation and the physical programming units for storing the update data into the physical address-logical address mapping table. Only at the appropriate time (e.g., when the host system is in an idle time or the physical address-logical address mapping table is fully written), the memory management circuit loads the corresponding logical address-physical address mapping table according to the mapping information in the physical address-logical address mapping table in order to update the mapping information between the logical pages and the physical programming units.

Further, when the number of spare physical erasing units in the spare area is not greater than a predefined value, the memory management circuit will perform a valid data merging procedure. Specifically, when the number of the spare physical erasing units in the predefined value is not greater than the predefined value, it indicates that the number the physical erasing units in the spare area is insufficient for writing. As such, the memory management circuit performs a data merging procedure also by loading the logical address-physical address mapping table in order to release more space for the spare area.

Because a storage space of the physical address-logical address mapping table is usually corresponding to one or multiples of the size of the active physical erasing unit in the spare area selected for writing the update data, when the physical address-logical address mapping table is fully written, a situation where the active physical erasing unit is fully written by the update data of the writing operation may often occur accordingly. When the active physical erasing unit is fully written by the update data and the number of the spare physical erasing units in the spare area is not greater than the predefined value, the memory management circuit will perform aforesaid valid data merging procedure. In other words, before the valid data merging procedure is performed, an erasing operation for the physical address-logical address mapping table is usually performed to update the logical address-physical address mapping table. Because the valid data merging procedure and the erasing operation are two mechanisms independent from each other in conventional art, in the case where the two mechanisms both require to load the logical address-physical address mapping table into the buffer memory, the same logical address-physical address mapping table may be repeatedly loaded into the buffer memory, such that a response-waiting time of the host system may become excessively long.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data management method, a memory controller and a memory storage apparatus, which are capable of effectively reducing the delay caused by performing the erasing operation for the physical address-logical address mapping table and performing the valid data merging procedure.

An exemplary embodiment of the invention provides a valid data merging method, which is adapted to a rewritable non-volatile memory module. The rewritable non-volatile memory module has a plurality of physical erasing units and each of the physical erasing units has a plurality of physical programming units. A plurality of logical address-physical address mapping tables are stored in the rewritable non-volatile memory module in order to record mapping information between a plurality of logical addresses and the physical programming units. The valid data merging method includes: selecting a first physical erasing unit from the physical erasing units; loading at least one first logical address-physical address mapping table among the logical address-physical address mapping tables from the rewritable non-volatile memory module according to a physical address-logical address mapping table; updating the first logical address-physical address mapping table according to the physical address-logical address mapping table; and identifying valid data in the first physical erasing unit according to the physical address-logical address mapping table and the first logical address-physical address mapping table; storing the first logical address-physical address mapping table back to the rewritable non-volatile memory module; copying the identified valid data from the first physical erasing unit to a second physical erasing unit among the physical erasing units; and performing an erasing operation for the first physical erasing unit.

An exemplary embodiment of the invention provides a memory controller configured to control a rewritable non-volatile memory module. The rewritable non-volatile memory module has a plurality of physical erasing units and each of the physical erasing units has a plurality of physical programming units. A plurality of logical address-physical address mapping tables are stored in the rewritable non-volatile memory module in order to record mapping information between a plurality of logical addresses and the physical programming units. The memory controller includes: a host interface configured to couple to a host system; a memory interface configured to couple to the rewritable non-volatile memory module; and a memory management circuit coupled to the host interface and the memory interface. The memory management circuit is configured to select a first physical erasing unit from the physical erasing units, load at least one first logical address-physical address mapping table among the logical address-physical address mapping tables from the rewritable non-volatile memory module according to a physical address-logical address mapping table, update the first logical address-physical address mapping table according to the physical address-logical address mapping table, and identify valid data in the first physical erasing unit according to the physical address-logical address mapping table and the first logical address-physical address mapping table. Further, the memory management circuit is further configured to store the first logical address-physical address mapping table back to the rewritable non-volatile memory module, copy the identified valid data from the first physical erasing unit to a second physical erasing unit among the physical erasing units, and perform an erasing operation for the first physical erasing unit.

An exemplary embodiment of the invention provides a memory storage apparatus, which includes: a connector configured to connect to a host system, a rewritable non-volatile memory module, and a memory controller. The rewritable non-volatile memory module has a plurality of physical erasing units and each of the physical erasing units has a plurality of physical programming units. A plurality of logical address-physical address mapping tables are stored in the rewritable non-volatile memory module in order to record mapping information between a plurality of logical addresses and the physical programming units. The memory controller is coupled to the connector and the rewritable non-volatile memory. The memory management circuit is configured to select a first physical erasing unit from the physical erasing units, and load at least one first logical address-physical address mapping table among the logical address-physical address mapping tables from the rewritable non-volatile memory module according to a physical address-logical address mapping table. Further, the memory controller is further configured to update the first logical address-physical address mapping table according to the physical address-logical address mapping table, and identify valid data in the first physical erasing unit according to the physical address-logical address mapping table and the first logical address-physical address mapping table. Furthermore, the memory controller is further configured to identify valid data in the first physical erasing unit according to the physical address-logical address mapping table and the first logical address-physical address mapping table, store the first logical address-physical address mapping table back to the rewritable non-volatile memory module, copy the identified valid data from the first physical erasing unit to a second physical erasing unit among the physical erasing units. The memory controller is further configured to perform an erasing operation for the first physical erasing unit.

Based on the above, the invention loads the logical address-physical address mapping tables separately for the updating operation of the logical address-physical address mapping table and the data merging procedure, so as to prevent the same logical address-physical address mapping table from being repeatedly loaded to thereby effectively solve the problem where delayed time of the host system is excessively long.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9A to FIG. 9C illustrate a simplified example for writing data.

FIG. 10A to FIG. 10C illustrate a simplified example for writing data.

FIG. 11A to FIG. 11C illustrate a simplified example for writing data.

FIG. 12A to FIG. 12C illustrate a simplified example of the valid data merging method.

FIG. 14A to FIG. 14C illustrate a simplified example of the valid data merging method.

DESCRIPTION OF THE EMBODIMENTS

Figure 1:
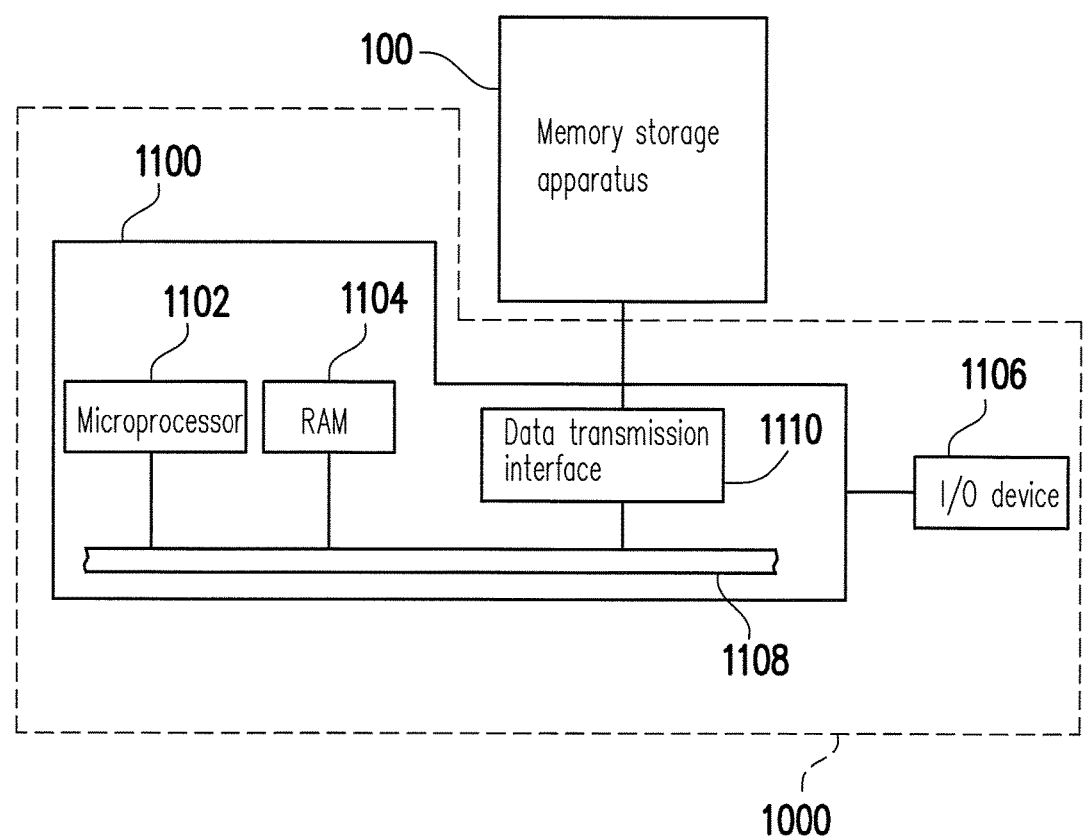
FIG. 1 illustrates a host system and a memory storage apparatus according to an exemplary embodiment.

Reference will now be made in detail to the present embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured together with a host system so that the host system may write data into the memory storage apparatus or read data from the memory storage apparatus.

FIG. 1 illustrates a host system and a memory storage apparatus according to an exemplary embodiment.

Figure 2:
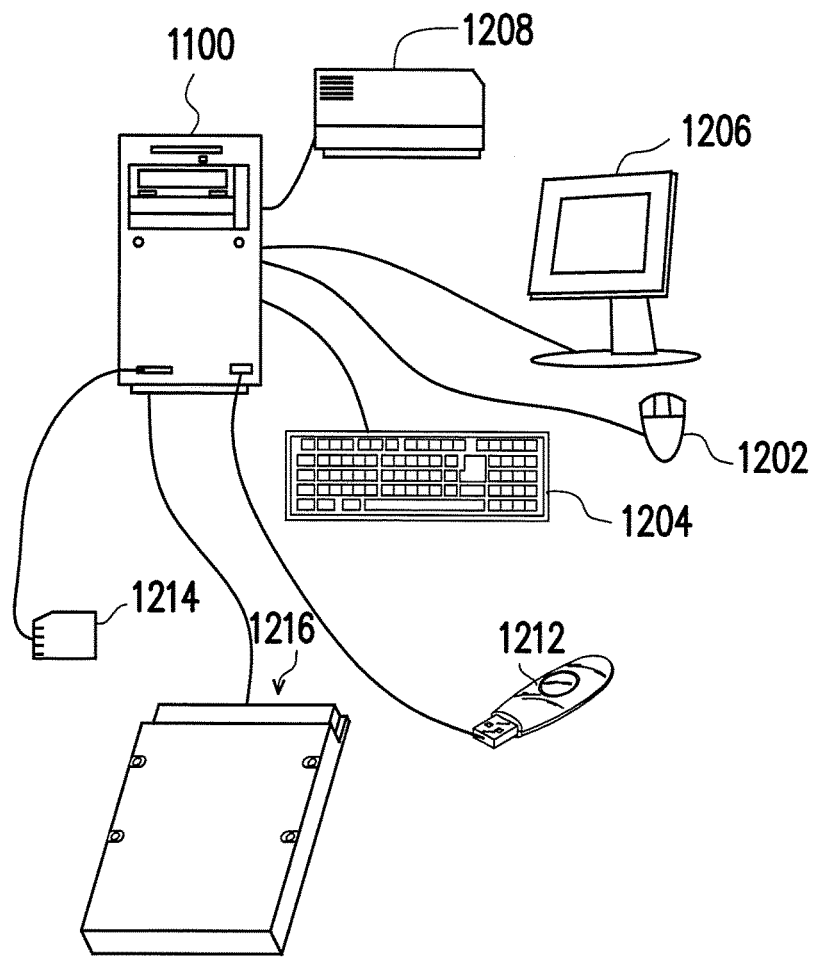
FIG. 2 is a schematic diagram illustrating a computer, an input/output device, and a memory storage apparatus according to an exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the present embodiment of the invention, the memory storage apparatus 100 is coupled to other devices of the host system 1000 through the data transmission interface 1110. By using the microprocessor 1102, the random access memory (RAM) 1104 and the Input/Output (I/O) device 1106, data may be written into the memory storage apparatus 100 or may be read from the memory storage apparatus 100. For example, the memory storage apparatus 100 may be a rewritable non-volatile memory storage apparatus such as a flash drive 1212, a memory card 1214, or a solid state drive (SSD) 1216 as shown in FIG. 2.

Figure 3:
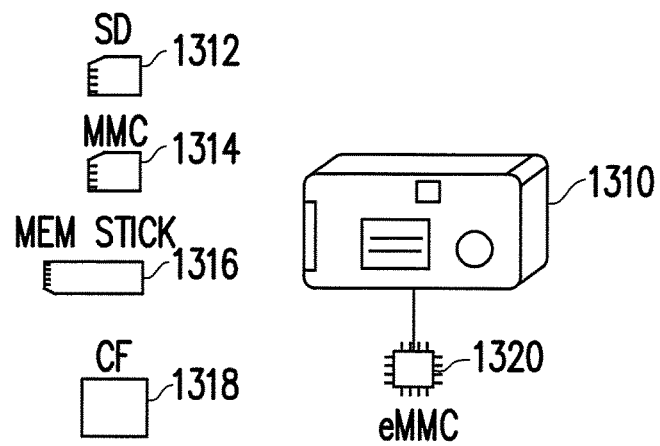
FIG. 3 is a schematic diagram illustrating a host system and a memory storage apparatus according to an exemplary embodiment.

Generally, the host system 1000 may substantially be any system capable of cooperating with the memory storage apparatus 100 for storing data. Even though the host system 1000 is illustrated as a computer system in the present exemplary embodiment, in another exemplary embodiment of the present invention, the host system 1000 may be a digital camera, a video camera, a telecommunication device, an audio player, or a video player. For example, when the host system is a digital camera (video camera) 1310, the rewritable non-volatile memory storage apparatus may be a SD card 1312, a MMC card 1314, a memory stick 1316, a CF card 1318 or an embedded storage device 1320 (as shown by FIG. 3). The embedded storage device 1320 includes an embedded MMC (eMMC). It should be mentioned that the eMMC is directly coupled to a substrate of the host system.

Figure 4:
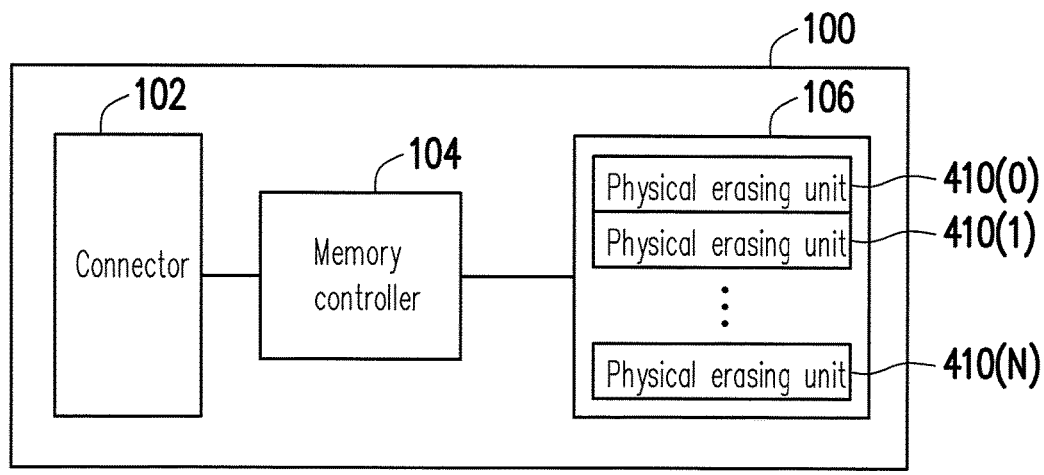
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connector 102, a memory controller 104 and a rewritable non-volatile memory module 106.

In the present exemplary embodiment, the connector 102 is compatible with a serial advanced technology attachment (SATA) standard. Nevertheless, it should be understood that the invention is not limited thereto. The connector 102 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards.

The memory controller 104 is configured to execute a plurality of logic gates or control instructions which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory controller 104 and configured to store data written from the host system 1000. The rewritable non-volatile memory storage module 106 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 4 physical access addresses, and the size of each physical access address is 512 bytes. However, in another exemplary embodiment, the data bit area may also include more or less of the physical access addresses, and an amount and a size of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 106 is a Multi Level Cell (MLC) NAND flash memory module (i.e., a flash memory module capable of storing two bits of data in one memory cell). However, the invention is not limited thereto. The rewritable non-volatile memory module 106 may also be a Single Level Cell (SLC) NAND flash memory module, (i.e., a flash memory module capable of storing one bit of data in one memory cell), a Trinary Level Cell (TLC) NAND flash memory module (i.e., a flash memory module capable of storing three bits of data in one memory cell), other flash memory modules or any memory module having the same features.

Figure 5:
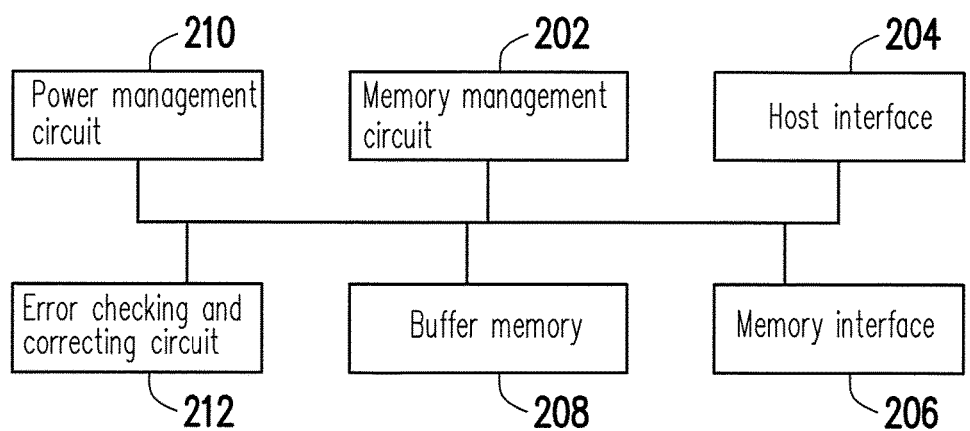
FIG. 5 is a schematic block diagram of a memory controller according to an exemplary embodiment.

FIG. 5 is a schematic block diagram of a memory controller according to an exemplary embodiment.

Referring to FIG. 5, the memory controller 104 includes a memory management circuit 202, a host interface 204 and a memory interface 206.

The memory management circuit 202 is configured to control the overall operations of the memory controller 104. Specifically, the memory management circuit 202 has a plurality of control instructions. When the memory storage apparatus 100 is operated, the control instructions are executed to perform various data operation such as data writing, data reading and data erasing.

In the present exemplary embodiment, the control instructions of the memory management circuit 202 are implemented in a form of a firmware. For instance, the memory management circuit 202 has a microprocessor unit (not illustrated) and a ROM (not illustrated), and the control instructions are burned into the ROM. When the memory storage apparatus 100 operates, the control instructions are executed by the microprocessor to perform operations of writing, reading or erasing data.

In another exemplary embodiment, the control instructions of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), the read only memory (not illustrated) and a random access memory (not illustrated). In particular, the ROM has a boot code, which is executed by the microprocessor unit to load the control instructions stored in the rewritable non-volatile memory module 106 to the RAM of the memory management circuit 202 when the memory controller 104 is enabled. Thereafter, the control instructions are executed by the microprocessor unit to execute operations of writing, reading or erasing data.

Further, in another exemplary embodiment, the control instructions of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 106; the memory writing circuit is configured to issue a write command to the rewritable non-volatile memory module 106 in order to write data into the rewritable non-volatile memory module 106; the memory reading circuit is configured to issue a read command to the rewritable non-volatile memory module 106 in order to read data from the rewritable non-volatile memory module 106; the memory erasing circuit is configured to issue an erase command to the rewritable non-volatile memory module 106 in order to erase data from the rewritable non-volatile memory module 106; the data processing circuit is configured to process both the data to be written to the rewritable non-volatile memory module 106 and the data to be read from the rewritable non-volatile memory module 106.

The host interface 204 is coupled to the memory management circuit 202 and configured for receiving and identifying commands and data sent from the host system 1000. In other words, the commands and data sent from the host system 1000 are passed to the memory management circuit 202 through the host interface 204. In the present exemplary embodiment, the host interface 204 is compatible with the SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment, the memory controller 104 further includes a buffer memory 208, a power management circuit 210 and an error checking and correcting circuit 212.

The buffer memory 208 is coupled to the memory management circuit 202 and configured to temporarily store data and commands from the host system 1000 or data from the rewritable non-volatile memory module 106. In the present exemplary embodiment, the buffer memory 208 is further configured to store a physical address-logical address mapping table, and the physical address-logical address mapping table is configured to record mapping information between the physical programming units of an active physical erasing unit among the physical erasing units and a plurality of updated logical addresses among the logical addresses. Specifically, when the host system 1000 intends to write update data into the rewritable non-volatile memory module 106, the memory management circuit 202 stores the update data into one active physical erasing unit in the spare area of the rewritable non-volatile memory module 106, and records the mapping information between the logical pages related to such writing operation and the physical programming units in the active physical erasing unit for storing the update data into the physical address-logical address mapping table.

The power management unit 210 is coupled to the memory management circuit 202 and configured to control a power of the memory storage apparatus 100.

The error checking and correcting circuit 212 is coupled to the memory management circuit 202 and configured to execute an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Subsequently, when the memory management circuit 202 reads the data from the rewritable non-volatile memory module 106, the error checking and correcting code corresponding to the data is also read, and the error checking and correcting circuit 212 may execute the error checking and correcting procedure for the read data according to the error checking and correcting code.

Figure 6:
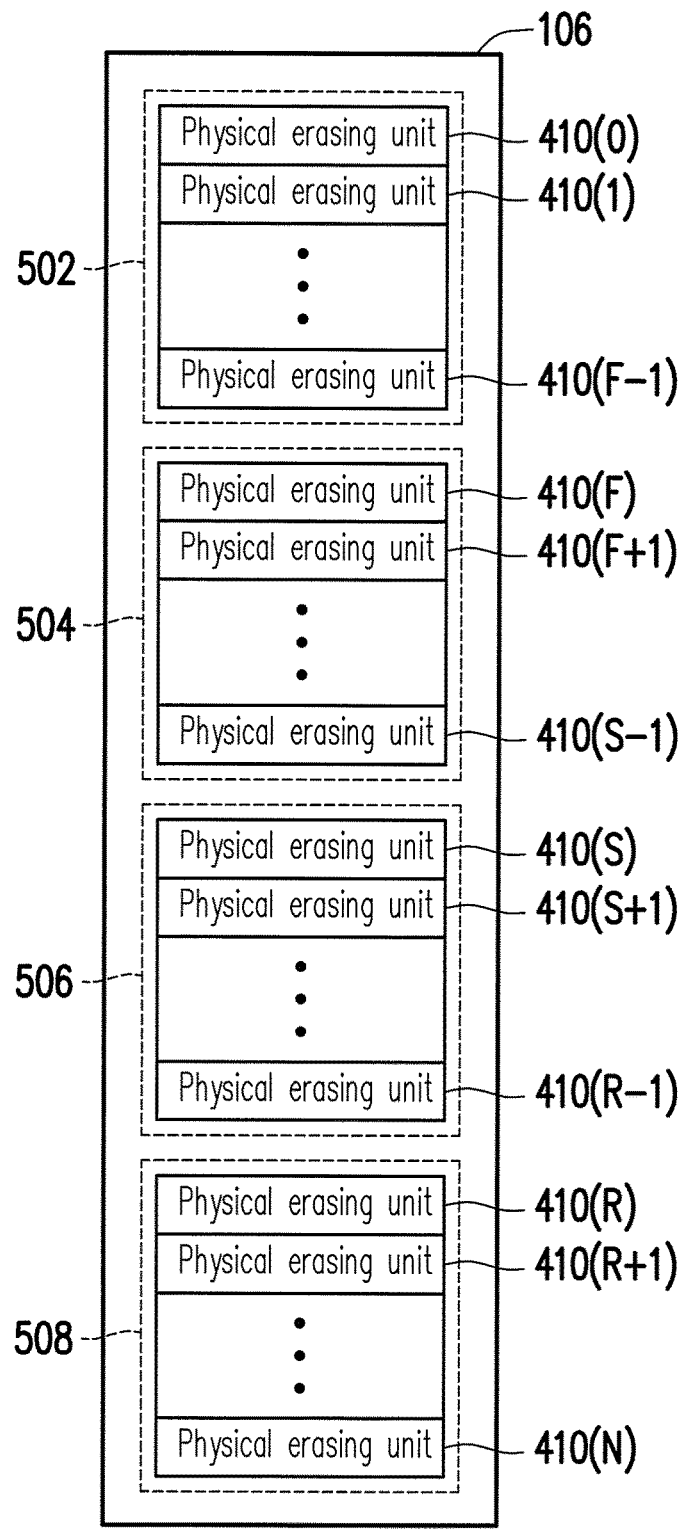
FIG. 6 and FIG. 7 are schematic diagrams illustrating a management of physical blocks according to an exemplary embodiment.
Figure 7:
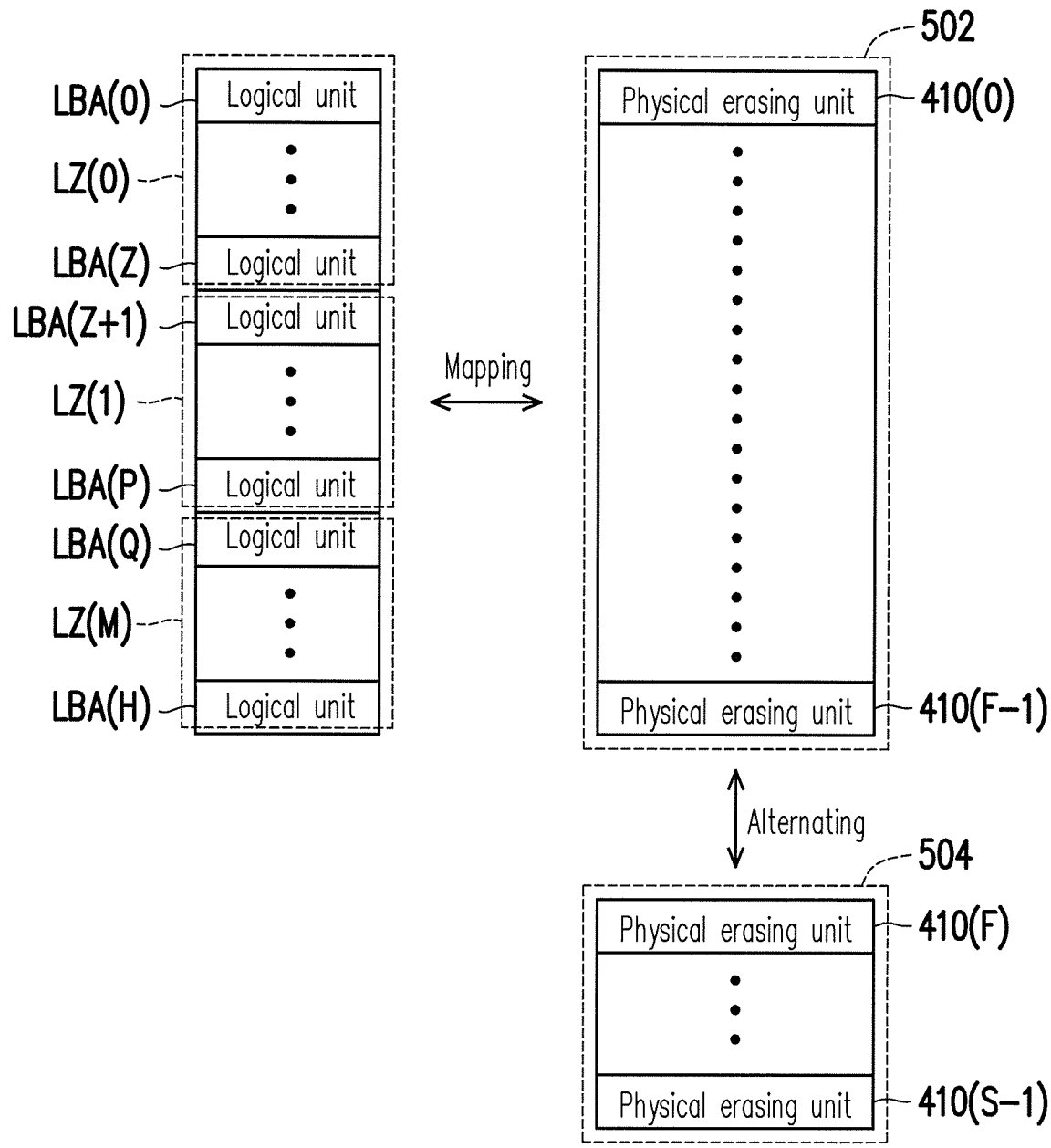

FIG. 6 and FIG. 7 are schematic diagrams illustrating a management of the physical erasing units according to an exemplary embodiment of the invention.

Referring to FIG. 6, the memory controller 104 (or the memory management circuit 202) may logically group the physical erasing units 410(0) to 410(N) into a data area 502, a spare area 504, a system area 506 and a replacement area 508.

The physical erasing units logically belonging to the data area 502 and the spare area 504 are configured to store data from the host system 1000. More specifically, the physical erasing units of the data area 502 are regarded as the physical erasing units stored with the data, whereas the physical erasing units of the spare area 504 are configured to replace the physical erasing units of the data area 502. In other words, when the write command and the data to be written are received from the host system 1000, the memory management unit 202 selects the physical erasing units from the spare area 504, and writes the data into the selected physical erasing units in order to replace the physical erasing units in the data area 502.

The physical erasing units logically belonging to the system area 506 are configured to record system data. For example, the system data includes information related to manufacturer and model of the rewritable non-volatile memory module, the number of physical erasing units in the rewritable non-volatile memory module, the number of the physical programming units in each physical erasing unit, and so forth. In the present exemplary embodiment, the system area 506 is further configured to store a valid data count table, and the valid data count table is configured to record valid data counts of the physical erasing units 410(0) to 410(F−1) in the data area 502. Herein, the valid data count is an amount of the physical programming units stored with valid data in one physical erasing unit. However, in an exemplary embodiment, the valid data count table can also be configured to record the valid data counts of all the physical erasing units 410(0) to 410(N) in the rewritable non-volatile memory module 106.

The physical erasing units logically belonging to the replacement area 508 are used in a bad physical erasing unit replacement procedure for replacing damaged physical erasing units. More specifically, if there are still available physical erasing units in the replacement area 508 when the physical erasing units of the data area 502 are damaged, the memory management circuit 202 gets the available physical erasing units from the replacement area 508 for replacing the damaged physical erasing units.

Particularly, the numbers of the physical erasing units in the data area 502, the spare area 504, the system area 506 and the replacement area 508 may be different from one another according to the different memory specifications. In addition, it should be understood that, during operations of the memory storage apparatus 100, grouping relations of the physical erasing units for associating with the data area 502, the spare area 504, the system area 506, and replacement area 508 may be dynamically changed. For example, when the damaged physical erasing units in the spare area 504 are replaced by the physical erasing units in the replacement area 508, the physical erasing units originally from the replacement area 508 are then associated with the spare area 504.

Referring to FIG. 7, the memory controller 104 (or the memory management circuit 202) may be configured with logical units LBA(0) to LBA(H) for mapping the physical erasing units in the data area 502, and each of the logical units includes a plurality of logical pages for mapping to the corresponding physical programming units of the physical erasing units. Further, when the host system 1000 intends to write the data into the logical units or update the data stored in the logical units, the memory controller 104 (or the memory management unit 202) gets one physical erasing unit as the active physical erasing unit from the spare area 504 to alternatively replace the physical erasing units of the data area 502 for writing data.

In order to identify which of the physical erasing units is stored with the data for each logical unit, the memory controller 104 (or the memory management circuit 202) records a mapping relation between the logical unit and the physical erasing unit in the present exemplary embodiment. Further, when the host system 1000 intends to access the data in the logical page, the memory controller 104 (or the memory management circuit 202) first identifies the logical unit belonging to the logical page, and accesses the data in the physical erasing units mapped to said logical unit. For instance, in the present exemplary embodiment, the memory controller 104 (or the memory management circuit 202) stores logical address-physical address mapping tables into the rewritable non-volatile memory module 106 for recording the physical erasing units mapped to the logical units, and the logical address-physical address mapping tables are loaded into the buffer memory 208 for maintenance when the memory controller 104 (or the memory management circuit 202) intends to the access the data.

It should be noted that, the mapping relations of all of the logical units cannot be recorded by one mapping table because a capacity of the buffer memory 208 is limited. Therefore, in the present exemplary embodiment, the memory controller 104 (or the memory management unit 202) groups the logical units LBA(0) to LBA(H) into a plurality of logical zones LZ(0) to LZ(M), and configures one logical address-physical address mapping table for each of the logical zones. In particular, when the memory controller 104 (or the memory management unit 202) intends to update the mapping information for one specific logical unit, the logical address-physical address mapping table corresponding to the logical zone to which the logical unit belongs is loaded into the buffer memory 208 for updating. In the present exemplary embodiment, a space required for storing all the logical address-physical address mapping tables is corresponding to $1/1000$ space in the rewritable non-volatile memory module 106 used for storing data. In other words, if the capacity of the rewritable non-volatile memory module 106 is 1 TB (Terabyte), the space required for storing all the logical address-physical address mapping tables is 1 GB (Gigabyte). However, in another exemplary embodiment, the space required for storing all the logical address-physical address mapping tables may be changed based on different capacities of the rewritable non-volatile memory module 106.

In the present exemplary embodiment, when the host system 1000 intends to perform the writing operation, the memory controller 104 (or the memory management circuit 202) gets one active physical erasing unit from the spare area 504, and writes data included in the write command (also known as the update data) from the host system 1000 into such active physical erasing unit.

Specifically, when the memory storage apparatus 100 receives the write command from the host system 1000, the data included in the write command from the host system 1000 can be written into one active physical erasing unit in the spare area 504. Further, when the active physical erasing unit is fully written, the memory controller 104 (or the memory management circuit 202) gets an empty physical erasing unit from the spare area 504 again as another active physical erasing unit to continue writing the data corresponding to the write command from the host system 1000.

It is worth mentioning that, when the memory storage apparatus 100 is in an idle state for a period of time (e.g., no command is received from the host system 1000 for over 30 seconds) or when the number of the empty physical erasing units in the spare area 504 is not greater than a predefined value, the memory controller 104 (or the memory management circuit 302) will perform a valid data merging procedure for the data area 502, so as to release the empty physical erasing units. In this exemplary embodiment, the predefined value is set to 1. Nevertheless, it should be understood that, in other exemplary embodiments, the predefined value may also be other suitable values.

FIG. 8A to FIG. 11C illustrate simplified examples for writing data.

For illustrative convenience, it is assumed herein that the data area 502 includes three physical erasing units which are the physical erasing units 410(0) to 410(2), and the spare area 504 includes two physical erasing units which are the physical erasing units 410(3) to 410(4). Herein, each of the physical erasing units includes three physical programming units, and when the memory controller 104 (or the memory management circuit 202) determines that the number of spare physical erasing units in the spare area 504 is not greater than a predefined value, the memory controller 104 (or the memory management circuit 202) will perform a valid data merging procedure in order to release more storage space. In this exemplary embodiment, the predefined value is 1. In other words, when only one empty physical erasing unit is left in the spare area 504, the memory controller 104 (or the memory management circuit 202) will perform said data merging procedure.

Figure 8A:
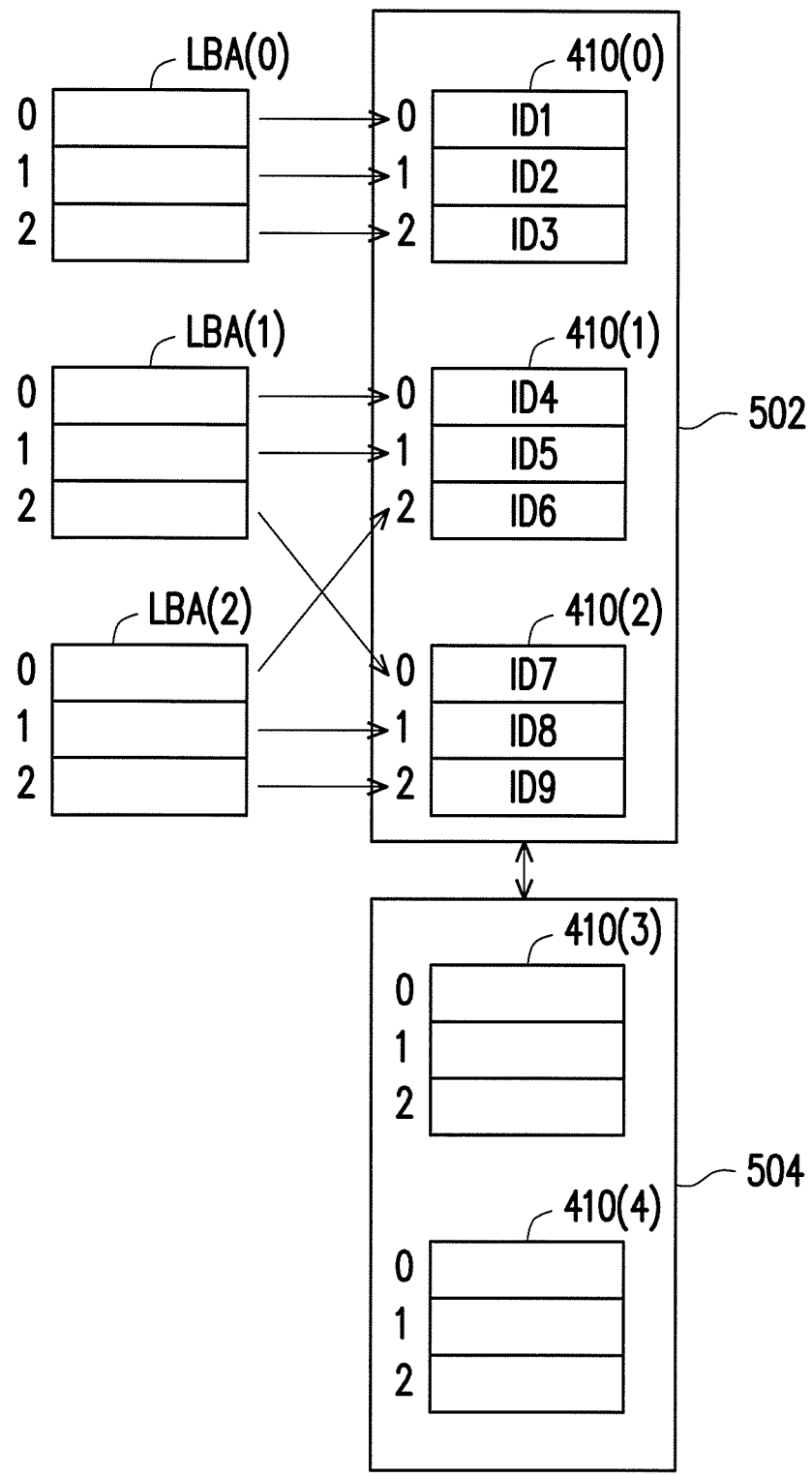
FIG. 8A to FIG. 8C illustrate a simplified example for writing data.
Figure 8B:
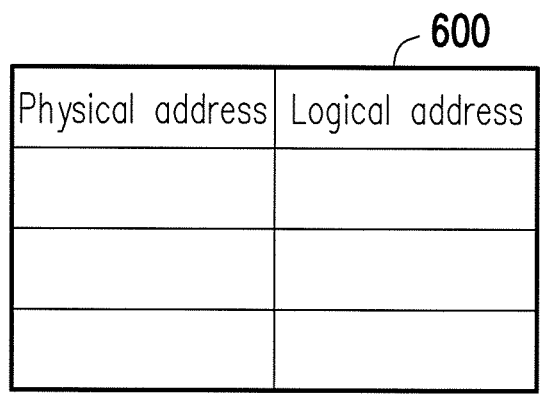
Figure 8C:
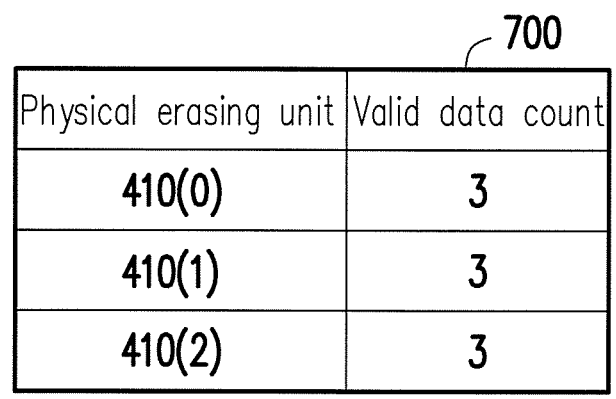

Referring to FIG. 8A, FIG. 8B and FIG. 8C together, it assumed that in the state of the memory storage apparatus 100 as shown in FIG. 8A, the logical pages of the logical units LBA(0) to LBA(2) are mapped to the physical programming units of the physical erasing units 410(0) to 410(2) in the data area 502, and the spare area 504 includes the physical erasing units 410(3) to 410(4). In other words, the memory controller 104 (or the memory management circuit 202) records mapping relations between the logical units LBA(0) to LBA(2) and the physical erasing units 410(0) and 410(4) into the logical address-physical address mapping tables, and the physical programming units of the physical erasing units 410(0) to 410(2) are regarded as stored the data (i.e., initial data ID1 to ID9) belonging to the logical pages of the logical units LBA(0) to LBA(2). In particular, in this exemplary embodiment, it is assumed that, currently, a $2^{nd}$ logical page of the logical unit LBA(1) is mapped to a $0^{th}$ physical programming unit of the physical erasing unit 410(2), and a $0^{th}$ logical page of the logical unit LBA(2) is mapped to a $2^{nd}$ physical programming unit of the physical erasing unit 410(1). Further, the memory controller 104 (or the memory management circuit 202) records the available physical erasing units 410(3) to 410(4) in the spare area 504, and when the host system 1000 performs the writing operation, the memory controller 104 (or the memory management circuit 202) records the mapping information corresponding to the writing operation into the buffer memory 208, such as a physical address-logical address mapping table 600 shown in FIG. 8B.

Specifically, when the host system 1000 performs the writing operation related to one logical page, the memory controller 104 (or the memory management circuit 202) writes the update data corresponding to the writing operation into the active physical erasing unit selected from the spare area 504. Meanwhile, the memory controller 104 (or the memory management circuit 202) does not immediately change the mapping relations between the logical units LBA(0) to LBA(2) and the physical erasing units 410(0) to 410(4) in the logical address-physical address mapping tables. Instead, the memory controller 104 (or the memory management circuit 202) records an address (also known as a physical address) of the physical programming unit for storing the update data in the active physical erasing unit together with an address (also known as a logical address) of the logical page corresponding to the writing operation into the physical address-logical address mapping table 600 in FIG. 8B. Only until the physical address-logical address mapping table 600 is fully written, the corresponding logical address-physical address mapping table is loaded into the buffer memory 208 according to the mapping information (i.e., the logical address corresponding to the update data) in the physical address-logical address mapping table 600, so as to update the mapping relations between the logical units LBA(0) to LBA(2) and the physical erasing units 410(0) to 410(4). It is worth mentioning that, when the memory storage apparatus 100 is in an idle state for a period of time (e.g., no command is received from the host system 1000 for over 30 seconds), the memory controller 104 (or the memory management circuit 202) can also load the corresponding logical address-physical address mapping table into the buffer memory 208 according to the mapping information in the physical address-logical address mapping table 600, so as to update the mapping relations between the logical units LBA(0) to LBA(2) and the physical erasing units 410(0) to 410(4).

Further, in the present exemplary embodiment, the memory controller 104 (or the memory management circuit 202) establishes a valid data count table 700 as shown in FIG. 8C for recording the valid data count of each of the physical erasing units 410(0) to 410(2) in the data area 502. Herein, the valid data count is an amount of the physical programming units stored with valid data in one physical erasing unit. For example, in correspondence to the state of FIG. 8A, the valid data count table 700 of FIG. 8C records that each of the valid data count of the physical erasing unit 410(0), the physical erasing unit 410(1) and the physical erasing unit 410(2) is 3. It should be understood that, in another exemplary embodiment, the valid data count table 700 can be configured to record the valid data count of each of the physical erasing units in the rewritable non-volatile memory module 106. In the present exemplary embodiment, during operation of the memory storage apparatus 100, the valid data count table 700 is loaded into the buffer memory 208 for updating and maintenance. Also, before shut down, the memory controller 104 (or the memory management circuit 202) stores the valid data count table 700 back to the system area 506.

Figure 9A:
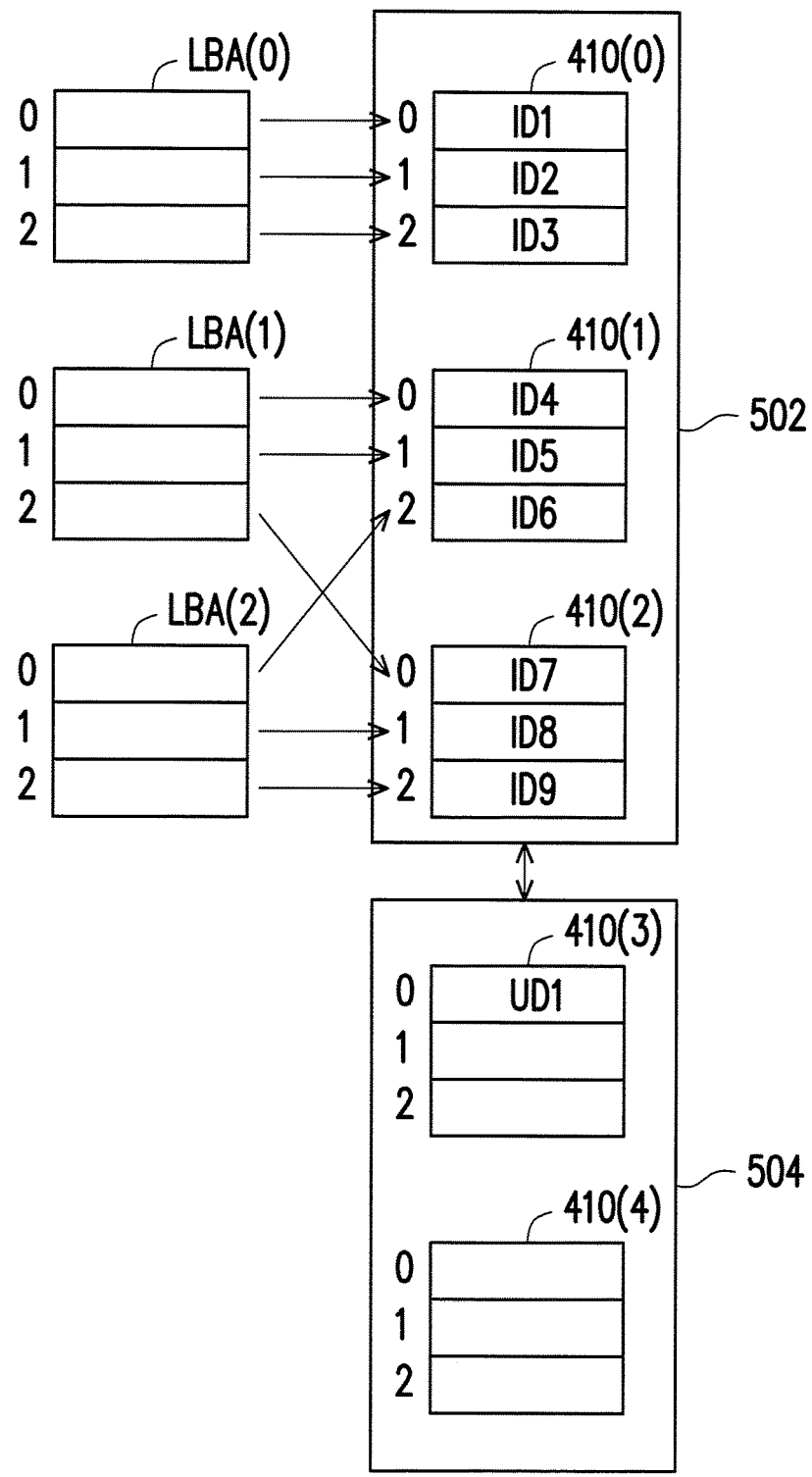

Referring to FIG. 9A, FIG. 9B and FIG. 9C, if the host system 1000 intends to write update data UD1 and the update data UD1 belongs to a $2^{nd}$ logical page of the logical unit LBA(0), the memory controller 104 (or the memory management circuit 202) gets, for example, the physical erasing unit 410(3) from the spare area 504 as the active physical erasing unit, and issues the write command to write the update data UD1 into a $0^{th}$ physical programming unit of the physical erasing unit 410(3). Subsequently, as shown in FIG. 9B, the memory controller 104 (or the memory management circuit 202) records mapping information between the $0^{th}$ physical programming unit of the physical erasing unit 410(3) (i.e., information "410(3)-0") and the $2^{nd}$ logical page of the logical unit LBA(0) (i.e., information "LBA(0)-2") into the physical address-logical address mapping table 600. Further, as shown in FIG. 9C, in correspondence to such writing operation, the memory controller 104 (or the memory management circuit 202) also changes the valid data count of the physical erasing unit 410(0) originally configured to store the data of the $2^{nd}$ logical page of the logical unit LBA(0) in the valid data count table 700 to 2.

Figure 10A:
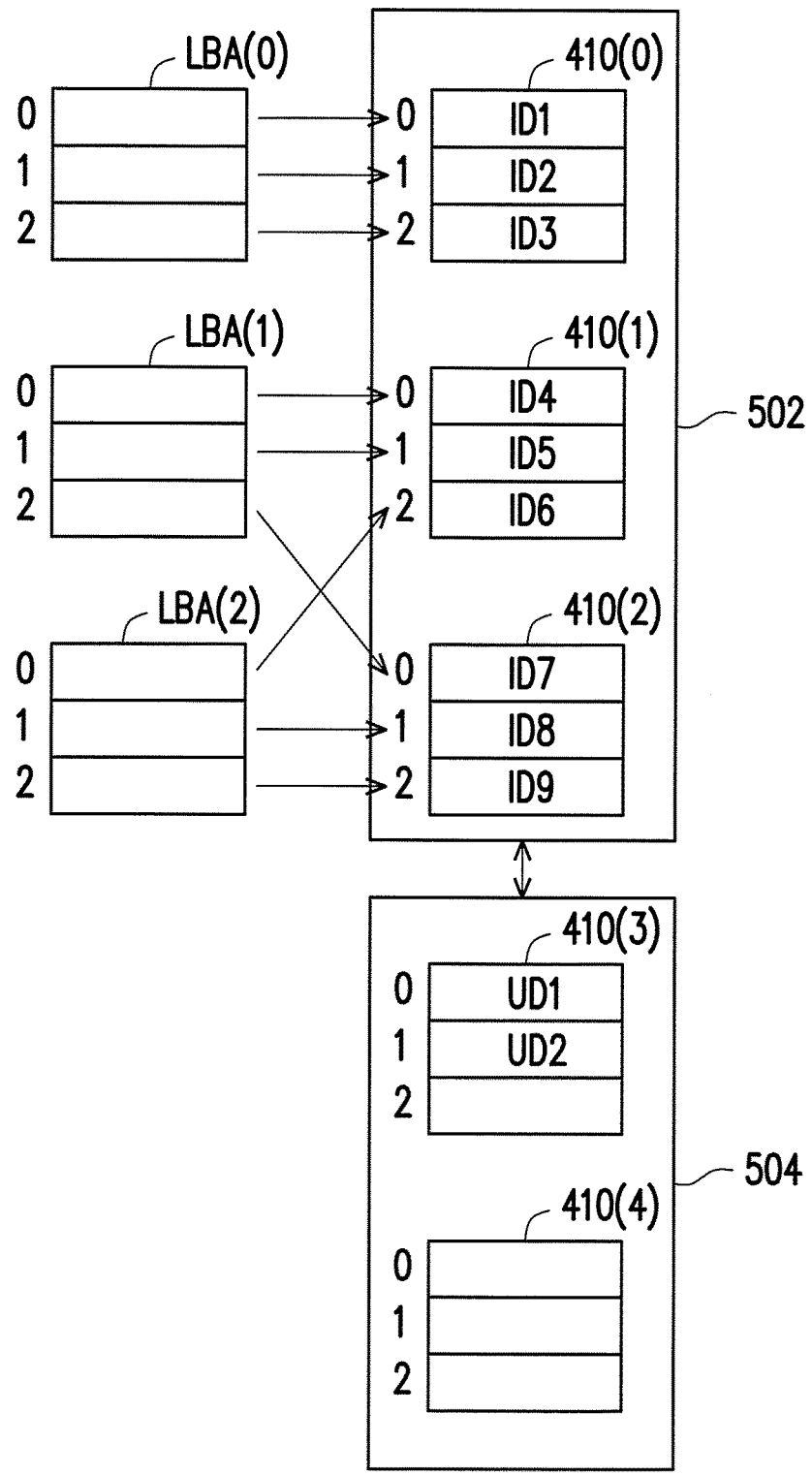

Referring to FIG. 10A, FIG. 10B and FIG. 10C which are in continuation to FIG. 9A, FIG. 9B and FIG. 9C respectively, if the host system 1000 intends to write update data UD2 and the update data UD2 belongs to a $0^{th}$ logical page of the logical unit LBA(1), the memory controller 104 (or the memory management circuit 202) writes the update data UD2 into a $1^{st}$ physical programming unit of the physical erasing unit 410(3). Subsequently, as shown in FIG. 10B, the memory controller 104 (or the memory management circuit 202) records mapping information between the $1^{st}$ physical programming unit of the physical erasing unit 410(3) (i.e., information "410(3)-1") and the $0^{th}$ logical page of the logical unit LBA(1) (i.e., information "LBA(1)-0") into the physical address-logical address mapping table 600. Further, as shown in FIG. 10C, in correspondence to such writing operation, the memory controller 104 (or the memory management circuit 202) also changes the valid data count of the physical erasing unit 410(1) originally configured to store the data of the $0^{th}$ logical page of the logical unit LBA(1) in the valid data count table 700 to 2.

Figure 11A:
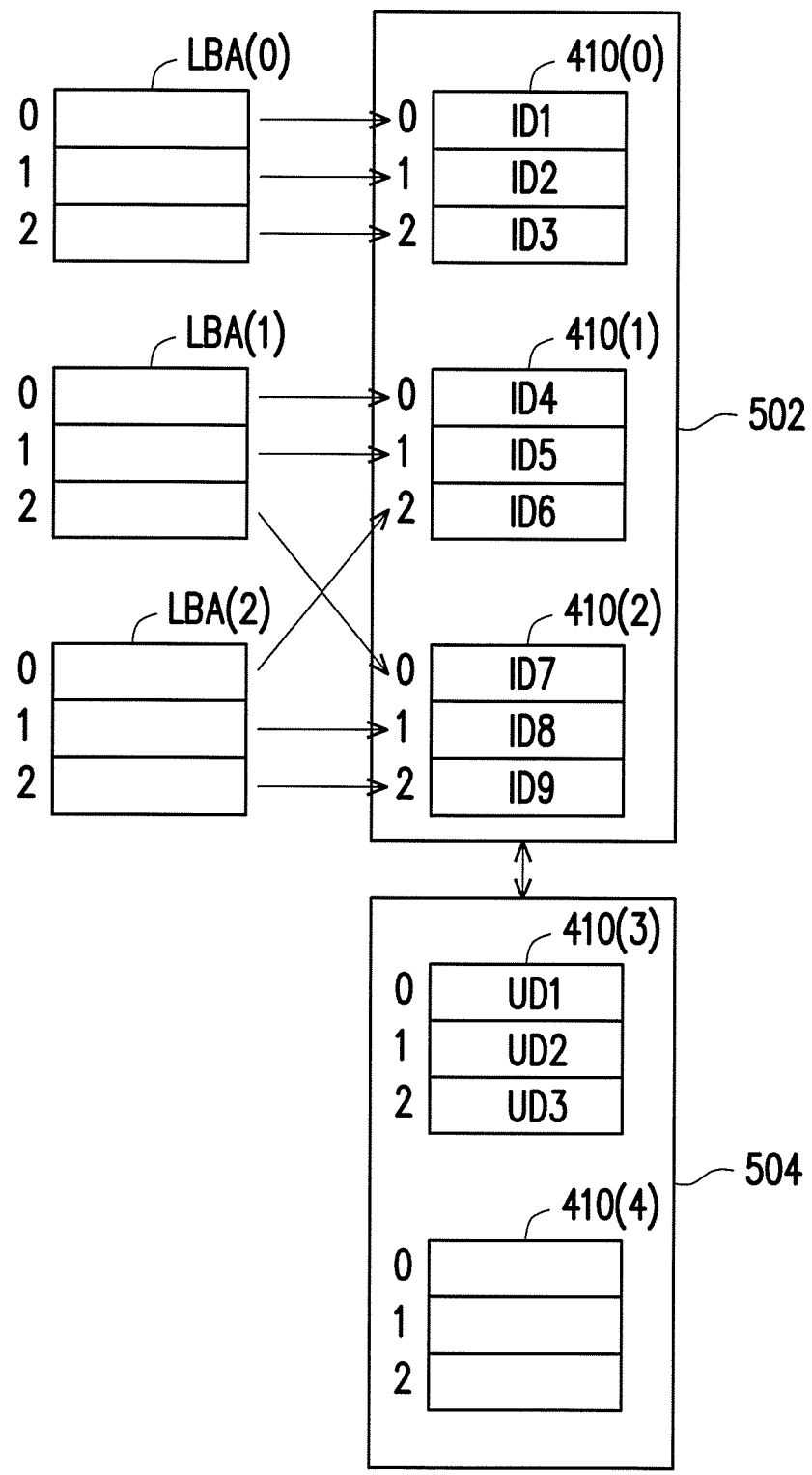

Referring to FIG. 11A, FIG. 11B and FIG. 11C which are in continuation to FIG. 10A, FIG. 10B and FIG. 10C respectively, if the host system 1000 intends to write update data UD3 and the update data UD3 belongs to a $1^{st}$ logical page of the logical unit LBA(1), the memory controller 104 (or the memory management circuit 202) writes the update data UD3 into a $2^{st}$ physical programming unit of the physical erasing unit 410(3). Subsequently, as shown in FIG. 11B, the memory controller 104 (or the memory management circuit 202) records mapping information between the $2^{nd}$ physical programming unit of the physical erasing unit 410(3) (i.e., information "410(3)-2") and the $1^{st}$ logical page of the logical unit LBA(1) (i.e., information "LBA(1)-1") into the physical address-logical address mapping table 600. Further, as shown in FIG. 11C, in correspondence to such writing operation, the memory controller 104 (or the memory management circuit 202) also changes the valid data count of the physical erasing unit 410(1) originally configured to store the data of the $1^{st}$ logical page of the logical unit LBA(1) in the valid data count table 700 to 1.

It should be understood that, because the physical address-logical address mapping table 600 is fully written at this time, the memory controller 104 (or the memory management circuit 202) loads the corresponding logical address-physical address mapping tables into buffer memory 208 according to the logical addresses (e.g., the information "LBA(0)-2", the information "LBA(1)-0" and the information "LBA(1)-1") corresponding to the mapping information in the physical address-logical address mapping table 600, so as to update the mapping relations between the logical units LBA(0) to LBA(2) and the physical erasing units 410(0) to 410(4). In addition, since the physical erasing unit 410(3) selected as the active physical erasing unit has no storage space, the memory controller 104 (or the memory management circuit 202) will determine that the number of the physical erasing units for writing the update data in the spare area 504 is not greater than a predefined value (e.g., the predefined value in the present exemplary embodiment is 1). That is, in this case, the memory controller 104 (or the memory management circuit 202) will perform the valid data merging procedure to release more space. For example, the memory controller 104 (or the memory management circuit 202) updates the mapping relations in the logical address-physical address mapping table to empty the physical address-logical address mapping table 600, and performs the data merging procedure for the rewritable non-volatile memory module 106.

It should be understood that, the method of updating the logical address-physical address mapping table by using the physical address-logical address mapping table and the method of performing the data merging procedure are two mechanisms independent from each other in the conventional art. Specifically, the logical address-physical address mapping table may be updated according to the mapping information stored in the physical address-logical address mapping table in order to load the corresponding logical address-physical address mapping table into the buffer memory for updating. Further, in the data merging procedure, all of the logical address-physical address mapping tables may be loaded into the buffer memory together with the physical address-logical address mapping table to compare (or identify) the physical programming units stored with the valid data and the physical programming units stored with the invalid data in the physical erasing units for the data merging procedure, so as to write the compared (or identified) valid data into other empty physical erasing units and change the mapping relations between the valid data and the logical pages. It should be noted that, because the storage space for storing information related to the writing operation in the physical address-logical address mapping table is usually corresponding to one or multiples of a size the active physical erasing unit for writing the update data, when the physical address-logical address mapping table is fully written, the active physical erasing unit is also fully written by the update data of the writing operation. When the active physical erasing unit is fully written by the update data and the number of the spare physical erasing units in the spare area 504 is not greater than the predefined value, the memory controller 104 (or the memory management circuit 202) performs the valid data merging procedure for the rewritable non-volatile memory module 106.

In other words, an updating operation for the physical address-logical address mapping table is usually performed before the valid data merging procedure is performed. Because the valid data merging procedure and the updating operation are two mechanisms which are independent from each other in conventional art, in the case where the two mechanisms both requires to load the logical address-physical address mapping table into the buffer memory, the same logical address-physical address mapping table may be repeatedly loaded into the buffer memory, such that a response-waiting time of the host system may become excessively long. Accordingly, the valid data merging method provided by this disclosure is configured to solve the issue of the loading time for the logical address-physical address mapping table being excessively long.

FIG. 12A to FIG. 14C illustrate a simplified example of the valid data merging method.

Figure 12A:
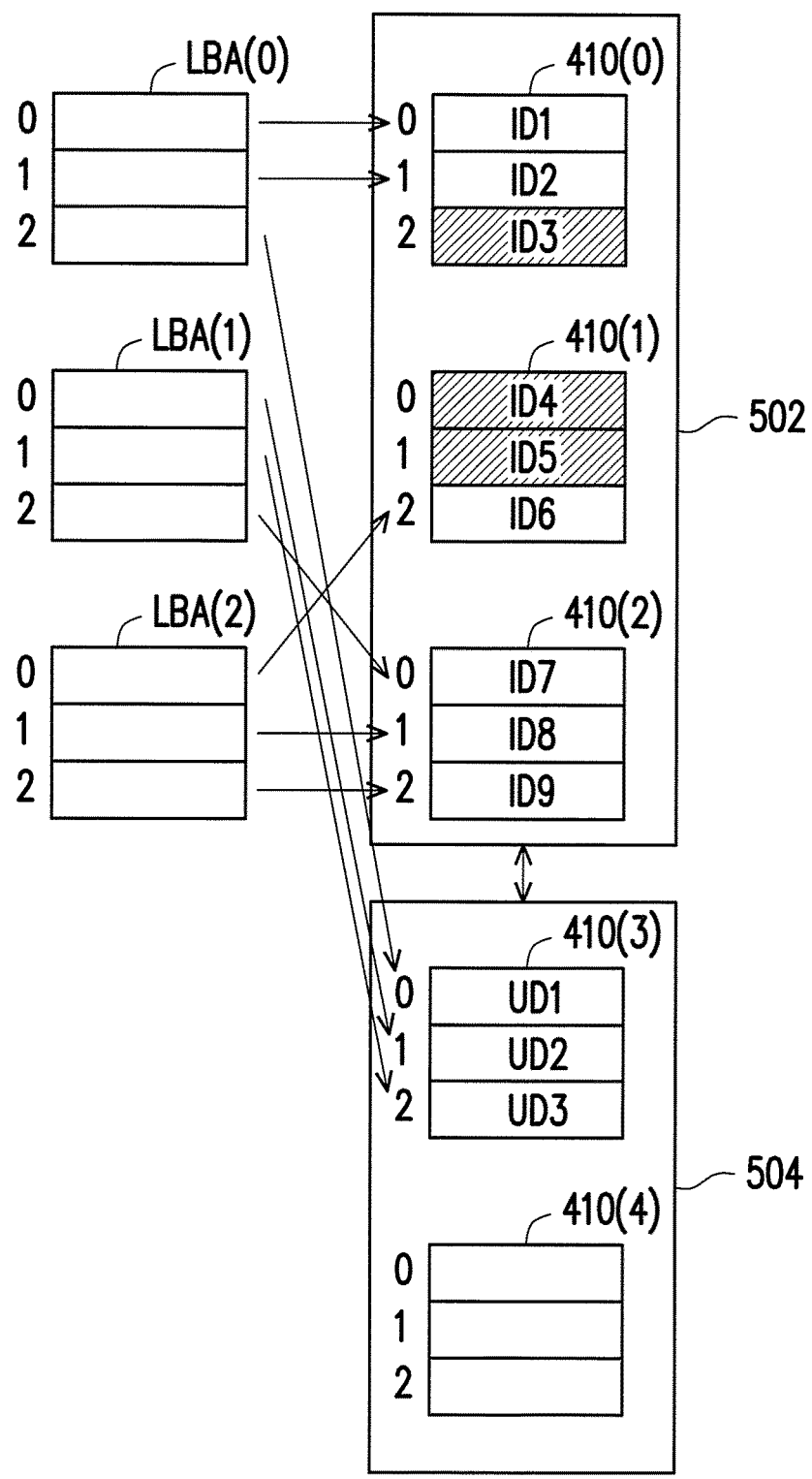

Referring to FIG. 12A, FIG. 12B and FIG. 12C which are in continuation to FIG. 11A, FIG. 11B and FIG. 11C respectively. In the present exemplary embodiment, the memory controller 104 (or the memory management circuit 202) first selects the physical erasing unit 410(1) (i.e., a first physical erasing unit) from the data area 502 according to the valid data count table 700 in FIG. 12C. Herein, the valid data count (i.e., the valid data count is 1) corresponding to the physical erasing unit 410(1) is less than the valid data counts of other physical erasing units (e.g., the physical erasing unit 410(0) and the physical erasing unit 410(3)) in the data area 502. In other words, the valid data count of the physical erasing unit 410(1) is the smallest in the data area 502 and the valid data stored in the physical erasing unit 410(1) is the least.

Subsequently, the memory controller 104 (or the memory management circuit 202) loads a logical address-physical address mapping table corresponding to the physical address-logical address mapping table 600 (i.e., a first logical address-physical address mapping table) from the rewritable non-volatile memory module 106 according to the physical address-logical address mapping table 600. Specifically, because the physical address-logical address mapping table 600 in FIG. 12B is stored with updating information (i.e., the information "LBA(0)-2") of the $2^{nd}$ logical page of the logical unit LBA(0), updating information (i.e., the information "LBA(1)-0") of the $0^{th}$ logical page of the logical unit LBA(1), and updating information (i.e., the information "LBA(1)-1") of the $1^{st}$ logical page of the logical unit LBA(1), the memory controller 104 (or the memory management circuit 202) correspondingly loads the logical address-physical address mapping table of the logical unit LBA(0) and the logical address-physical address mapping table of the logical unit LBA(1) (i.e., the first logical address-physical address mapping table) from the rewritable non-volatile memory module 106 into the buffer memory 208.

Subsequently, the memory controller 104 (or the memory management circuit 202) updates the mapping information between the logical unit LBA(0) and LBA(1) and the physical erasing units 410(0) to 410(3) according to the information stored in the physical address-logical address mapping table 600. Specifically, because the physical address-logical address mapping table 600 is stored with the updating information regarding the update data UD1 of the $2^{nd}$ logical page of the logical unit LBA(0) (i.e., the information "LBA(0)-2") being stored into the $0^{th}$ physical programming unit of the physical erasing unit 410(3) (i.e., the information "410(3)-0"), the updating information regarding the update data UD2 of the $0^{th}$ logical page of the logical unit LBA(1) (i.e., the information "LBA(1)-0") being stored into the $1^{st}$ physical programming unit of the physical erasing unit 410(3) (i.e., the information "410(3)-1"), and the updating information regarding the update data UD3 of the $1^{st}$ logical page of the logical unit LBA(1) (i.e., the information "LBA(1)-1") being stored into the $2^{nd}$ physical programming unit of the physical erasing unit 410(3) (i.e., the information "410(3)-2"). The memory controller 104 (or the memory management circuit 202) updates the logical address-physical address mapping table of the logical unit LBA(0) and the logical address-physical address mapping table of the logical unit LBA(1) respectively, so as to map the $2^{nd}$ logical page of the logical unit LBA(0) to the $0^{th}$ physical programming unit of the physical erasing unit 410(3), map the $0^{th}$ logical page of the logical unit LBA(1) to the $1^{st}$ physical programming unit of the physical erasing unit 410(3), and map the $1^{st}$ logical page of the logical unit LBA(1) to the $2^{nd}$ physical programming unit of the physical erasing unit 410(3).

Subsequently, the memory controller 104 (or the memory management circuit 202) locates the valid data in the physical erasing unit 410(1) according to the physical address-logical address mapping table 600, the logical address-physical address mapping table of the logical unit LBA(0) and the logical address-physical address mapping table of the logical unit LBA(1). Specifically, referring to FIG. 11A, the memory controller 104 (or the memory management circuit 202) first confirms the mapping relation before updating according to the logical address-physical address mapping table of the logical unit LBA(1). Herein, the $0^{th}$ logical page of the logical unit LBA(1) is originally mapped to a $0^{th}$ physical programming unit of the physical erasing unit 410(1), the $1^{st}$ logical page of the logical unit LBA(1) is originally mapped to a $1^{st}$ physical programming unit of the physical erasing unit 410(1), and the $2^{nd}$ logical page of the logical unit LBA(1) is originally mapped to a $0^{th}$ physical programming unit of the physical erasing unit 410(2). Subsequently, the memory controller 104 (or the memory management circuit 202) determines that the $0^{th}$ logical page of the logical unit LBA(1) and the $1^{st}$ logical page of the logical unit LBA(1) are already updated according to the information LBA(1)-0 and the information LBA(1)-1 stored in the physical address-logical address mapping table 600, and the update data is stored into the $1^{st}$ physical programming unit of the physical erasing unit 410(3) and the $2^{nd}$ physical programming unit of the physical erasing unit 410(3). Therefore, the memory controller 104 (or the memory management circuit 202) can determine that initial data ID4 and initial data ID5 in the physical erasing unit 410(1) are the invalid data.

It should be understood that, in the present exemplary embodiment, steps of the valid data merging procedure include: updating the first logical address-physical address mapping table first, and then identifying the valid data in the first physical erasing unit according to the physical address-logical address mapping table and the first logical address-physical address mapping table. However, it should be noted that, in other exemplary embodiments, the first physical erasing unit may also be identified according to the physical address-logical address mapping table and the first logical address-physical address mapping table first before the first logical address-physical address mapping table is updated, but the invention is not particularly limited to thereto.

Referring back to FIGS. 12A, 12B, and 12C, next, the memory controller 104 (or the memory management circuit 202) stores the updated logical address-physical address mapping tables of logical unit LBA(0) and the logical unit LBA(1) back to the rewritable non-volatile memory module 106. It should be noted that, the present exemplary embodiment is not intended to limit a timing for storing the first logical address-physical address mapping table back to the rewritable non-volatile memory module 106. In another embodiment, the first logical address-physical address mapping table may also be stored back to the rewritable non-volatile memory module 106 after the data merging method of the invention is completed, but the present invention is not limited thereto.

Subsequently, the memory controller 104 (or the memory management circuit 202) determines whether the physical erasing unit 410(1) (i.e., the first physical erasing unit) is stored with other valid data. Specifically, the memory controller 104 (or the memory management circuit 202) determines whether the physical erasing unit 410(1) (i.e., the first physical erasing unit) is stored with other valid data not yet identified. It should be noted that, in an exemplary embodiment, if the memory controller 104 (or the memory management circuit 202) identifies that the number of the valid data in the physical erasing unit 410(1) is exactly equal to a value of the valid data count related to the physical erasing unit 410(1) in the valid data count table 700 according to the logical address-physical address mapping tables of the logical unit LBA(0) and the logical unit LBA(1), the memory controller 104 (or the memory management circuit 202) can determine that all the valid data in the physical erasing unit 410(0) are mapped to the logical unit LBA(0) or the logical unit LBA(1). In this case, it is possible that the memory controller 104 (or the memory management circuit 202) does not load other logical address-physical address mapping tables from the rewritable non-volatile memory module 106, but directly copies all the valid data in the physical erasing unit 410(1) to other physical erasing units according to the mapping information in the logical unit LBA(0) or the logical unit LBA(1), so as to perform the valid data merging operation.

However, in an exemplary embodiment, the memory controller 104 (or the memory management circuit 202) determines that the physical erasing unit 410(1) is stored one valid data (i.e., the valid data count of the physical erasing unit 410(1) is 1) according to the valid data count table 700 in FIG. 12C, and the mapping information regarding the valid data in the physical erasing unit 410(1) is not stored in the logical unit LBA(0) and the logical unit LBA(1). Therefore, the memory controller 104 (or the memory management circuit 202) identifies the logical address corresponding to the valid data in the physical erasing unit 410(1) by loading the logical address-physical address mapping table of the logical unit LBA(2) (hereinafter, also known as a second logical address-physical address mapping table). In other words, the memory controller 104 (or the memory management circuit 202) loads other logical address-physical address mapping tables (i.e., the logical address-physical address mapping table of the logical unit LBA(2)) except the logical address-physical address mapping table of the logical unit LBA(0) and the logical address-physical address mapping table of the logical unit LBA(1) from the rewritable non-volatile memory module 106.

Subsequently, the memory controller 104 (or the memory management circuit 202) locates other valid data in the physical erasing unit 410(1) according the physical address-logical address mapping table 600 and the logical address-physical address mapping table of the logical unit LBA(2). Specifically, the memory controller 104 (or the memory management circuit 202) learns that the $0^{th}$ logical page of the logical unit LBA(2) is initially mapped to the $2^{nd}$ physical programming unit of the physical erasing unit 410(1) according to the logical address-physical address mapping table of the logical unit LBA(2). However, because the updating information regarding the $0^{th}$ logical page of the logical unit LBA(2) is not stored in the physical address-logical address mapping table 600, the memory controller 104 (or the memory management circuit 202) will determine that the initial data ID6 of the $0^{th}$ logical page of the logical unit LBA(2) is not yet updated. Then, the memory controller 104 (or the memory management circuit 202) determines that initial data ID6 is the valid data.

Figure 13A:
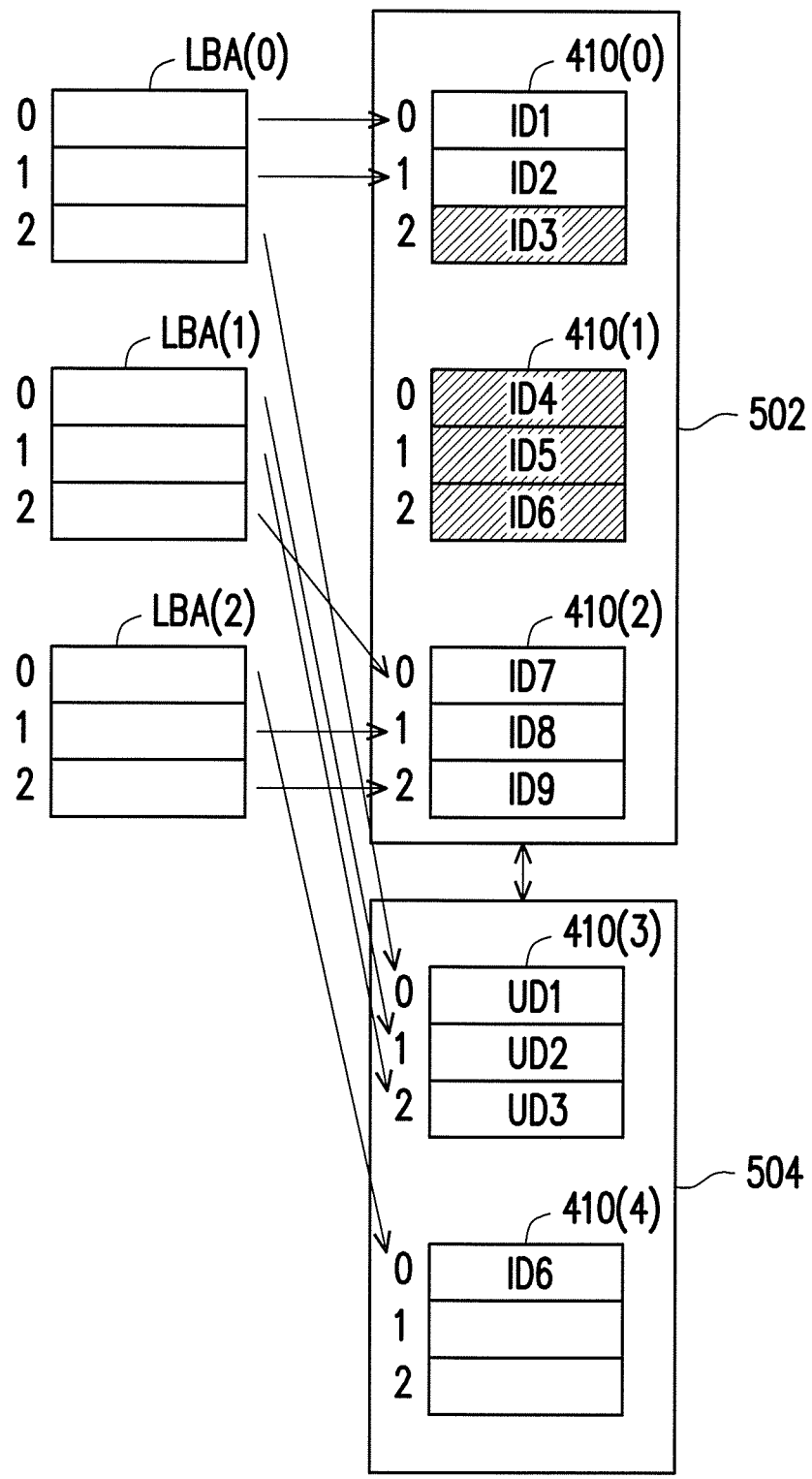
FIG. 13A to FIG. 13C illustrate a simplified example of the valid data merging method.
Figure 13B:
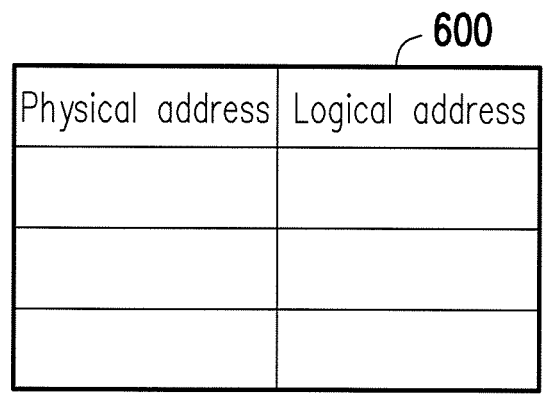
Figure 13C:
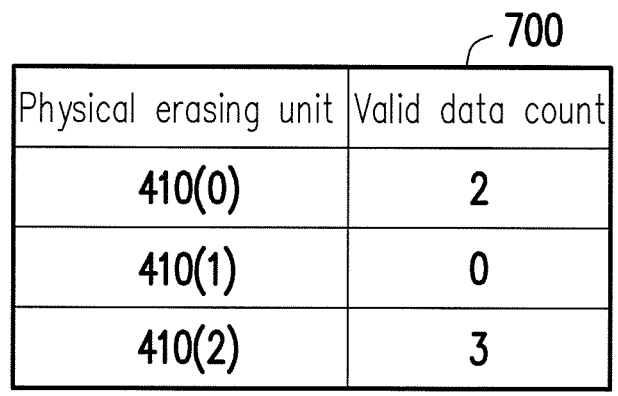

Referring to FIG. 13A, FIG. 13B and FIG. 13C which are in continuation to FIG. 12A, FIG. 12B and FIG. 12C respectively, the memory controller 104 (or the memory management circuit 202) selects the physical erasing unit 410(4) (i.e., the second physical erasing unit) from the spare area 504, and copies the initial data ID6 to the $0^{th}$ physical programming unit of the physical erasing unit 410(4). Subsequently, the memory controller 104 (or the memory management circuit 202) updates the logical address-physical address mapping table of the logical unit LBA(2), maps the $0^{th}$ logical page of the logical unit LBA(2) to the $0^{st}$ physical programming unit of the physical erasing unit 410(4), and adjusts the valid data count corresponding to the physical erasing unit 410(1) in the valid data count table 700 in FIG. 13C to 0. In other words, after the valid data (i.e., the initial data ID6) originally in the physical erasing unit 410(1) is copied to the $0^{th}$ physical programming unit of the physical erasing unit 410(4), all the data stored in the physical erasing unit 410(1) are the invalid data. Further, the memory controller 104 (or the memory management circuit 202) clears the updating information stored in the physical address-logical address mapping table 600, so as to release the space of the physical address-logical address mapping table 600, as shown in FIG. 13B.

Figure 14A:
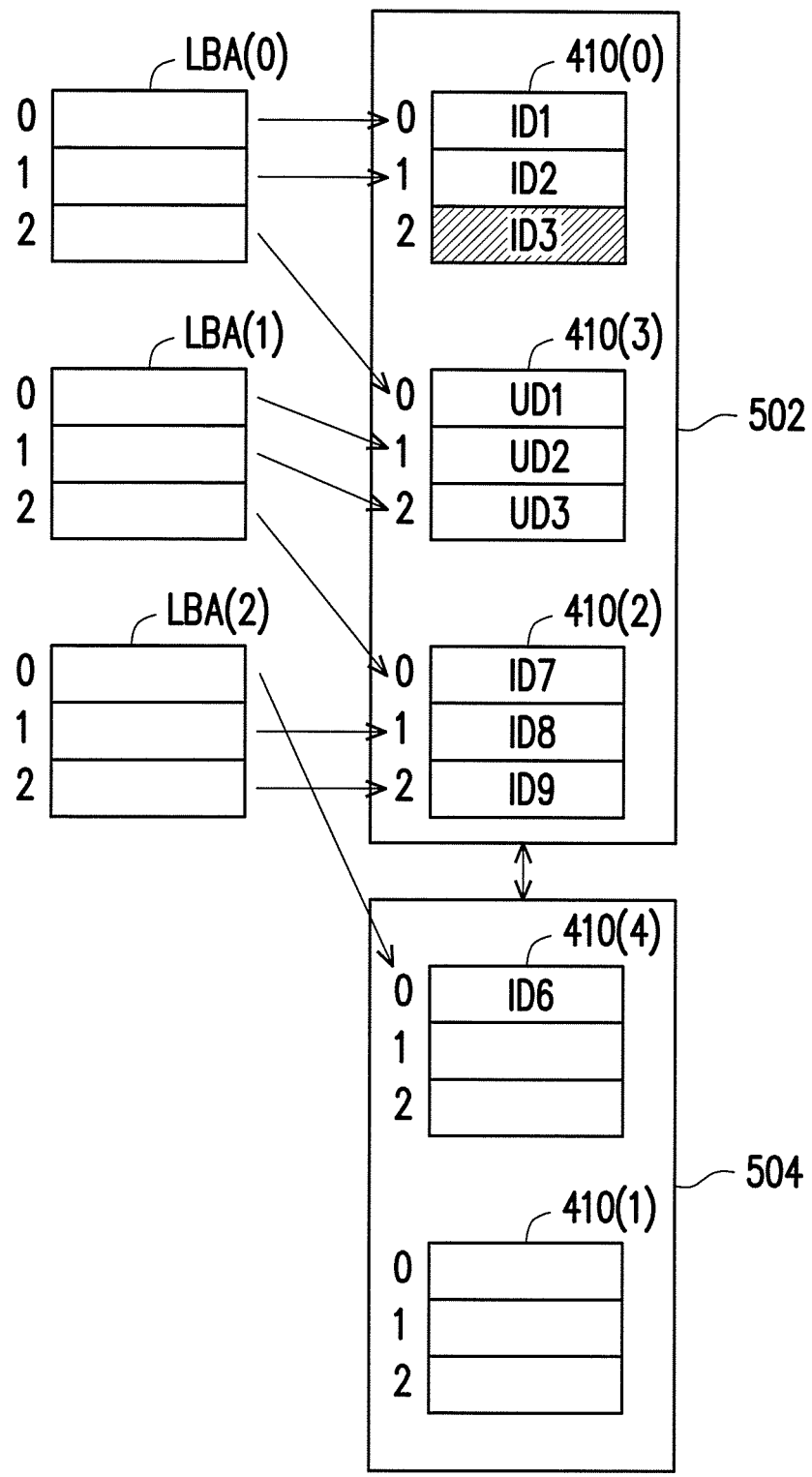

Referring to FIG. 14A, FIG. 14B and FIG. 14C which are in continuation to FIG. 13A, FIG. 13B and FIG. 13C respectively, the memory controller 104 (or the memory management circuit 202) performs the erasing operation for the physical erasing unit 410(1) and associates the physical erasing unit 410(1) with the spare area 504. Further, the memory controller 104 (or the memory management circuit 202) associates the physical erasing unit 410(3) to the data area 502, and correspondingly changes the valid data count table 700. It should be noted that, in the present exemplary embodiment, the valid data count table 700 is merely used to record the valid data counts of the physical erasing units in the data area 502. Therefore, in FIG. 14C, the memory controller 104 (or the memory management circuit 202) deletes the record originally corresponding to the physical erasing unit 410(1), and adds the record of the physical erasing unit 410(3) to record the valid data count of the physical erasing unit 410(3) having the value of 3. However, in other exemplary embodiments, the valid data count table 700 can also record the valid data counts of all the physical erasing units in the rewritable non-volatile memory module 106.

Based on the above, the present exemplary embodiment loads the logical address-physical address mapping tables separately for the updating operation of the logical address-physical address mapping table and the data merging procedure, so as to decrease the chance that the same logical address-physical address mapping table from being repeatedly loaded and thereby causing a delayed time of the host system 1000 is excessively long.

It is worth mentioning that, in an exemplary embodiment, when the physical address-logical address mapping table 600 is fully written, the memory controller 104 (or the memory management circuit 202) first determines whether the number of the physical erasing units in the spare area 504 is not greater than a predefined value (e.g., the predefined value is 1). If the memory controller 104 (or the memory management circuit 202) determines that the number of the physical erasing units in the spare area 504 is not greater than the predefined value, it indicates that the number of the empty physical erasing units in the spare area 504 is insufficient. Accordingly, the memory controller 104 (or the memory management circuit 202) performs the data merging operation as shown in FIGS. 12 to 14, so as to release more space. If the memory controller 104 (or the memory management circuit 202) determines that the number of the physical erasing units in the spare area 504 is greater than the predefined value, it indicates that the number of the empty physical erasing units in the spare area 504 is still sufficient. The memory control circuit unit 104 (or the memory management circuit 202) does not need to perform the valid data merging operation, but may only need to perform the updating operation for the logical address-physical address mapping table to clear the information in the physical address-logical address mapping table.

Specifically, when the memory controller 104 (or the memory management circuit 202) determines that the number of the physical erasing units in the spare area 504 is greater than the predefined value, the memory controller 104 (or the memory management circuit 202) may only need to load the corresponding logical address-physical address mapping table according to the updating information of the data in the physical address-logical address mapping table, update the mapping relations between the logical units LBA(0) to LBA(2) and the physical erasing units 410(0) to 410(4), and then store the updated logical address-physical address mapping tables back to the rewritable non-volatile memory module 106. In other words, if the spare area 504 still includes the sufficient number of the physical erasing units for writing, when the physical address-logical address mapping table 600 is fully written, only the updating operation for the logical address-physical address mapping table is required in order to release the space of the physical address-logical address mapping table 600.

Figure 15:
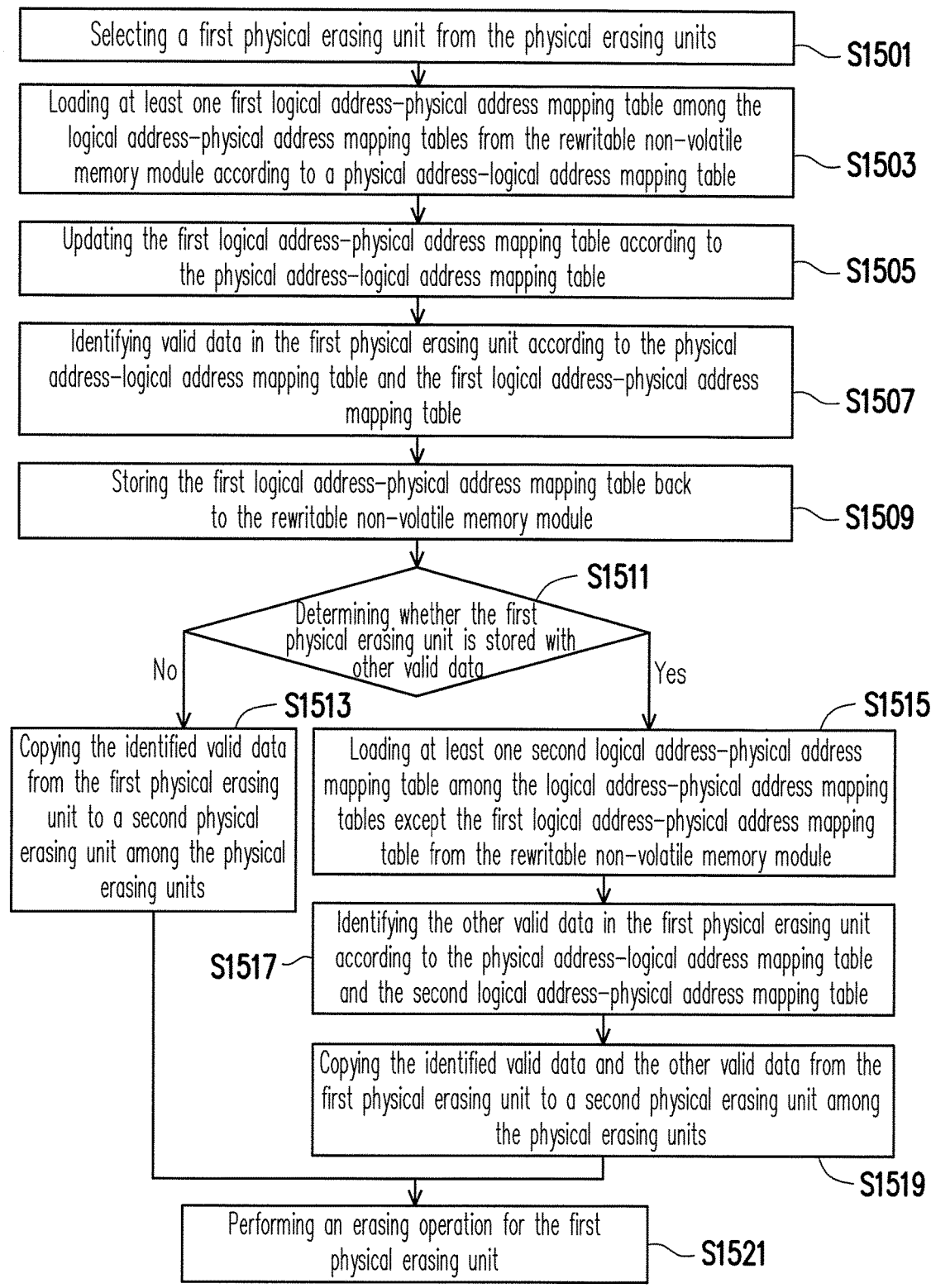
FIG. 15 is a flowchart of a valid data merging method according to an exemplary embodiment.

FIG. 15 is a flowchart of a valid data merging method according to an exemplary embodiment.

Referring to FIG. 15, first of all, a physical erasing unit (hereinafter, also known as a first physical erasing unit) is selected from the physical erasing units (step S1501). Further, at least one first logical address-physical address mapping table among the logical address-physical address mapping tables is loaded from the rewritable non-volatile memory module according to a physical address-logical address mapping table (step S1503). Then, the first logical address-physical address mapping table according to the physical address-logical address mapping table (step S1505). Further, valid data in the first physical erasing unit is identified according to the physical address-logical address mapping table and the first logical address-physical address mapping table (step S1507). Then, the first logical address-physical address mapping table is stored back to the rewritable non-volatile memory module (step S1509). Thereafter, whether the first physical erasing unit is stored with other valid data is determined (step S1511). If the first physical erasing unit is not stored with the other valid data, the identified valid data is copied from the first physical erasing unit to a second physical erasing unit among the physical erasing units (step S1513). An erasing operation is performed for the first physical erasing unit (step S1521). If the first physical erasing unit is stored with the other valid data, at least one second logical address-physical address mapping table among the logical address-physical address mapping tables except the first logical address-physical address mapping table is loaded from the rewritable non-volatile memory module (step S1515). Further, the other valid data in the first physical erasing unit is identified according to the physical address-logical address mapping table and the second logical address-physical address mapping table (step S1507). Lastly, copying the identified valid data and the other valid data from the first physical erasing unit to an empty physical erasing unit (hereinafter, also known as a second physical erasing unit) among the physical erasing units (step S1519). Then, the erasing operation is performed for the first physical erasing unit (step S1521).

Figure 16:
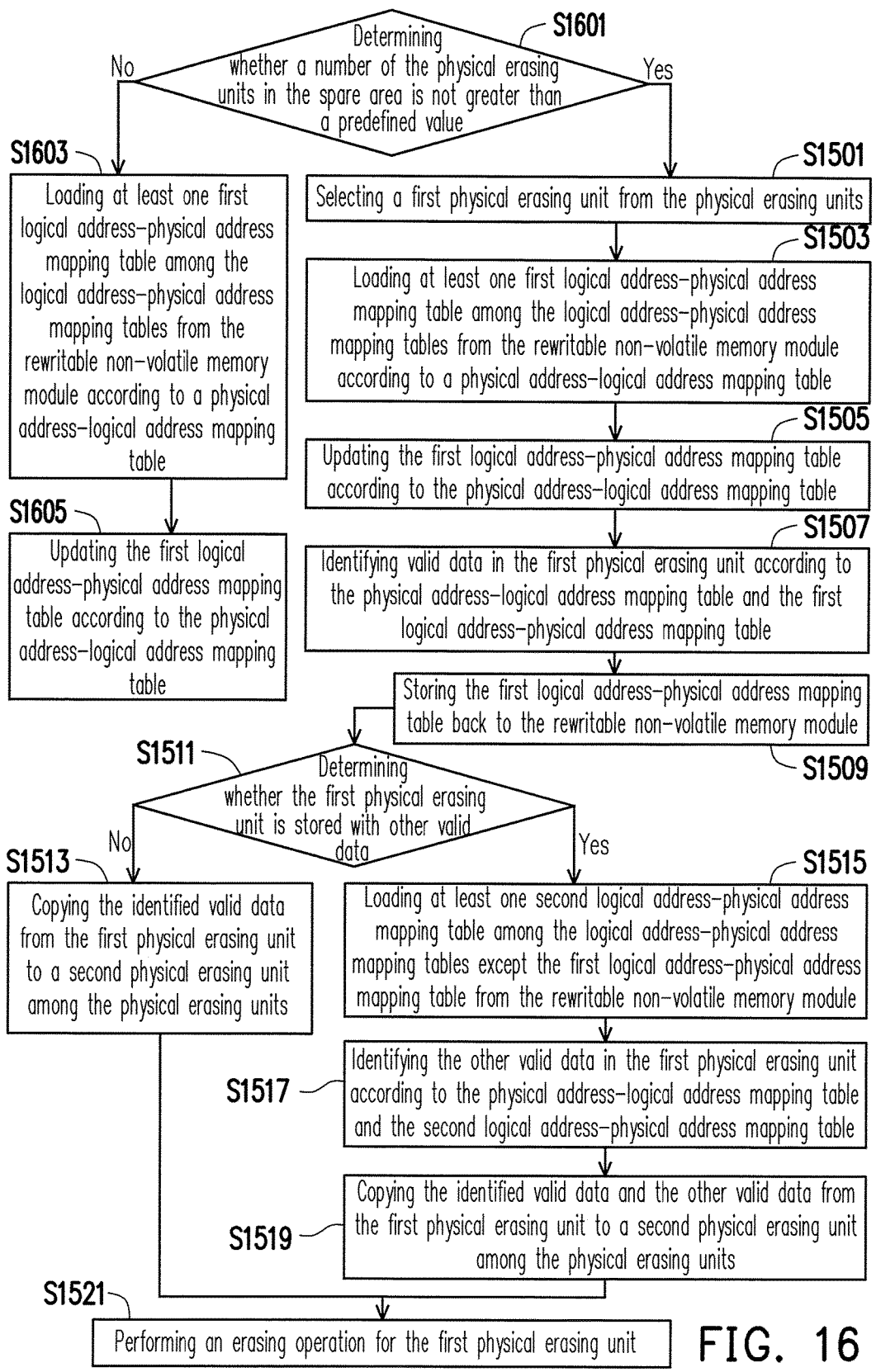
FIG. 16 is a flowchart of a valid data merging method according to another exemplary embodiment.

FIG. 16 is a flowchart of a valid data merging method according to another exemplary embodiment.

Referring to FIG. 16, firstly, whether a number of the physical erasing units in the spare area is not greater than a predefined value is determined (step S1601).

If the number of the physical erasing units in the spare area is not greater than the predefined value, aforesaid steps S1501, S1503, S1505, S1507, S1509, S1511, S1513, S1515, S1517, S1519 and S1521 are then performed.

If the number of the physical erasing units in the spare area is greater than the predefined value, at least one first logical address-physical address mapping table among the logical address-physical address mapping tables is loaded from the rewritable non-volatile memory module according to a physical address-logical address mapping table (S1603). Then, the first logical address-physical address mapping table is updated according to the physical address-logical address mapping table, and the first logical address-physical address mapping table is stored back to the rewritable non-volatile memory module (step S1605).

In summary, the present invention loads the logical address-physical address mapping tables separately for the updating operation of the logical address-physical address mapping table and the data merging procedure, so as to prevent the same logical address-physical address mapping table from being repeatedly loaded to thereby effectively solve the problem where waiting time of the host system is excessively long. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valid data merging method for a rewritable non-volatile memory module, wherein the rewritable non-volatile memory module has a plurality of physical erasing units, each of the physical erasing units has a plurality of physical programming units, a plurality of logical address-physical address mapping tables are stored in the rewritable non-volatile memory module to record mapping information between a plurality of logical addresses and the physical programming units, the valid data merging method comprising:

selecting a first physical erasing unit from the physical erasing units;
loading at least one first logical address-physical address mapping table among the logical address-physical address mapping tables from the rewritable non-volatile memory module according to a physical address-logical address mapping table which is not one of the plurality of logical address-physical address mapping tables;
updating the at least one first logical address-physical address mapping table according to the physical address-logical address mapping table;
identifying valid data in the first physical erasing unit according to the physical address-logical address mapping table and the at least one first logical address-physical address mapping table;
storing the at least one first logical address-physical address mapping table back to the rewritable non-volatile memory module;
copying the identified valid data from the first physical erasing unit to a second physical erasing unit among the physical erasing units; and
performing an erasing operation to the first physical erasing unit.

2. The valid data merging method of claim 1, wherein before performing the erasing operation for the first physical erasing unit, the valid data merging method comprises:

loading at least one second logical address-physical address mapping table among the logical address-physical address mapping tables except the at least one first logical address-physical address mapping table from the rewritable non-volatile memory module when the first physical erasing unit is stored with other valid data,
identifying the other valid data in the first physical erasing unit according to the physical address-logical address mapping table and the at least one second logical address-physical address mapping table, and
copying the identified other valid data from the first physical erasing unit to the second physical erasing unit among the physical erasing units.

3. The valid data merging method of claim 1, further comprising:

establishing the physical address-logical address mapping table in a buffer memory, wherein the physical address-logical address mapping table records the mapping information between the physical programming units of an active physical erasing unit among the physical erasing units and a plurality of updated logical addresses among the logical addresses,
wherein the at least one first logical address-physical address mapping table is recorded with the mapping information corresponding to the updated logical addresses.

4. The valid data merging method of claim 1, further comprising:

recording a valid data count of each of the physical erasing units according to an amount of the valid data in the physical erasing units.

5. The valid data merging method of claim 4, further comprising:

establishing a valid data count table for recording the valid data count of each of the physical erasing units.

6. The valid data merging method of claim 4, wherein the physical erasing units are at least grouped into a data area and a spare area, and the physical erasing units in the spare area are configured to replace the physical erasing units in the data area for writing data.

7. The valid data merging method of claim 6, wherein the step of selecting the first physical erasing unit from the physical erasing units comprises:

selecting the first physical erasing unit from the data area, wherein the valid data count of the first physical erasing unit is less than the valid data counts of other physical erasing units in the data area.

8. The valid data merging method of claim 7, further comprising:

determining whether the number of the physical erasing units in the spare area is not greater than a predefined value;
if the number of the physical erasing units in the spare area is not greater than the predefined value,
selecting the first physical erasing unit from the physical erasing units,
loading the at least one first logical address-physical address mapping table among the logical address-physical address mapping tables from the rewritable non-volatile memory module according to the physical address-logical address mapping table,
updating the at least one first logical address-physical address mapping table according to the physical address-logical address mapping table,
identifying the valid data in the first physical erasing unit according to the physical address-logical address mapping table and the at least one first logical address-physical address mapping table,
storing the at least one first logical address-physical address mapping table back to the rewritable non-volatile memory module,
copying the identified valid data from the first physical erasing unit to the second physical erasing unit among the physical erasing units, and
performing the erasing operation to the first physical erasing unit; and
if the number of the physical erasing units in the spare area is greater than the predefined value,
loading the at least one first logical address-physical address mapping table among the logical address-physical address mapping tables from the rewritable non-volatile memory module according to the physical address-logical address mapping table, and
updating the at least one first logical address-physical address mapping table according to the physical address-logical address mapping table.

9. A memory controller for controlling a rewritable non-volatile memory module, comprising:

a host interface configured to couple to a host system;

a memory interface configured to couple to the rewritable non-volatile memory module, wherein the rewritable non-volatile memory module has a plurality of physical erasing units, each of the physical erasing units has a plurality of physical programming units, and a plurality of logical address-physical address mapping tables are stored in the rewritable non-volatile memory module to record mapping information between a plurality of logical addresses and the physical programming units; and a memory management circuit coupled to the host interface and the memory interface, wherein the memory management circuit is configured to select a first physical erasing unit from the physical erasing units, wherein the memory management circuit is further configured to load at least one first logical address-physical address mapping table among the logical address-physical address mapping tables from the rewritable non-volatile memory module according to a physical address-logical address mapping table which is not one of the plurality of logical address-physical address mapping tables, wherein the memory management circuit is further configured to update the at least one first logical address-physical address mapping table according to the physical address-logical address mapping table, wherein the memory management circuit is further configured to identify valid data in the first physical erasing unit according to the physical address-logical address mapping table and the at least one first logical address-physical address mapping table, wherein the memory management circuit is further configured to store the at least one first logical address-physical address mapping table back to the rewritable non-volatile memory module, wherein the memory management circuit is further configured to copy the identified valid data from the first physical erasing unit to a second physical erasing unit among the physical erasing units, wherein the memory management circuit is further configured to perform an erasing operation to the first physical erasing unit.

10. The memory controller of claim 9, wherein before the memory management circuit performs the erasing operation for the first physical erasing unit, the memory management circuit is further configured to load at least one second logical address-physical address mapping table among the logical address-physical address mapping tables except the at least one first logical address-physical address mapping table from the rewritable non-volatile memory module when the first physical erasing unit is stored with other valid data, identify the other valid data in the first physical erasing unit according to the physical address-logical address mapping table and the at least one second logical address-physical address mapping table, and copy the identified other valid data from the first physical erasing unit to the second physical erasing unit among the physical erasing units.

11. The memory controller of claim 9, wherein the memory management circuit is further configured to establish the physical address-logical address mapping table in a buffer memory, wherein the physical address-logical address mapping table records the mapping information between the physical programming units of an active physical erasing unit among the physical erasing units and a plurality of updated logical addresses among the logical addresses, wherein the at least one first logical address-physical address mapping table is recorded with the mapping information corresponding to the updated logical addresses.

12. The memory controller of claim 9, wherein the memory management circuit is further configured to record a valid data count of each of the physical erasing units according to an amount of the valid data in the physical erasing units.

13. The memory controller of claim 12, wherein the memory management circuit is further configured to establish a valid data count table for recording the valid data count of each of the physical erasing units.

14. The memory controller of claim 12, wherein the memory management circuit is further configured to at least group the physical erasing units into a data area and a spare area, and the physical erasing units in the spare area are configured to replace the physical erasing units in the data area for writing data.

15. The memory controller of claim 14, wherein in the operation of selecting the first physical erasing unit from the physical erasing units by the memory management circuit, the memory management circuit is further configured to select the first physical erasing unit from the data area, wherein the valid data count of the first physical erasing unit is less than the valid data counts of other physical erasing units in the data area.

16. The memory controller of claim 15, wherein the memory management circuit is further configured to determine whether the number of the physical erasing units in the spare area is not greater than a predefined value, if the number of the physical erasing units in the spare area is not greater than the predefined value, the memory management circuit selects the first physical erasing unit from the physical erasing units, the memory management circuit loads the at least one first logical address-physical address mapping table among the logical address-physical address mapping tables from the rewritable non-volatile memory module according to the physical address-logical address mapping table, the memory management circuit updates the at least one first logical address-physical address mapping table according to the physical address-logical address mapping table, the memory management circuit identifies the valid data in the first physical erasing unit according to the physical address-logical address mapping table and the at least one first logical address-physical address mapping table, the memory management circuit stores the at least one first logical address-physical address mapping table back to the rewritable non-volatile memory module, the memory management circuit copies the identified valid data from the first physical erasing unit to the second physical erasing unit among the physical erasing units, the memory management circuit performs the erasing operation to the first physical erasing unit, if the number of the physical erasing units in the spare area is greater than the predefined value, the memory management circuit loads the at least one first logical address-physical address mapping table among the logical address-physical address mapping tables from the rewritable non-volatile memory module according to the physical address-logical address mapping table, the memory management circuit updates the at least one first logical address-physical address mapping table according to the physical address-logical address mapping table.

17. A memory storage apparatus, comprising:
a connector configured to couple to a host system;
a rewritable non-volatile memory module having a plurality of physical erasing units, wherein each of the physical erasing units has a plurality of physical programming units, and a plurality of logical address-physical address mapping tables are stored in the rewritable non-volatile memory module to record mapping information between a plurality of logical addresses and the physical programming units; and
a memory controller coupled to the connector and the rewritable non-volatile memory,
wherein the memory controller is configured to select a first physical erasing unit from the physical erasing units,
wherein the memory controller is further configured to load at least one first logical address-physical address mapping table among the logical address-physical address mapping tables from the rewritable non-volatile memory module according to a physical address-logical address mapping table which is not one of the plurality of logical address-physical address mapping tables,
wherein the memory controller is further configured to update the at least one first logical address-physical address mapping table according to the physical address-logical address mapping table,
wherein the memory controller is further configured to identify valid data in the first physical erasing unit according to the physical address-logical address mapping table and the at least one first logical address-physical address mapping table,
wherein the memory controller is further configured to store the at least one first logical address-physical address mapping table back to the rewritable non-volatile memory module,
wherein the memory controller is further configured to copy the identified valid data from the first physical erasing unit to a second physical erasing unit among the physical erasing units,
wherein the memory controller is further configured to perform an erasing operation to the first physical erasing unit.

18. The memory storage apparatus of claim 17, wherein before the memory controller performs the erasing operation for the first physical erasing unit,
the memory controller is further configured to load at least one second logical address-physical address mapping table among the logical address-physical address mapping tables except the at least one first logical address-physical address mapping table from the rewritable non-volatile memory module when the first physical erasing unit is stored with other valid data, identify the other valid data in the first physical erasing unit according to the physical address-logical address mapping table and the at least one second logical address-physical address mapping table, and copy the identified other valid data from the first physical erasing unit to the second physical erasing unit among the physical erasing units.

19. The memory storage apparatus of claim 17, wherein the memory controller is further configured to establish the physical address-logical address mapping table in a buffer memory, wherein the physical address-logical address mapping table records the mapping information between the physical programming units of an active physical erasing unit among the physical erasing units and a plurality of updated logical addresses among the logical addresses,
wherein the at least one first logical address-physical address mapping table is recorded with the mapping information corresponding to the updated logical addresses.

20. The memory storage apparatus of claim 17, wherein the memory controller is further configured to record a valid data count of each of the physical erasing units according to an amount of the valid data in the physical erasing units.

21. The memory storage apparatus of claim 20, wherein the memory controller is further configured to establish a valid data count table for recording the valid data count of each of the physical erasing units.

22. The memory storage apparatus of claim 20, wherein the memory controller is further configured to at least group the physical erasing units into a data area and a spare area, and the physical erasing units in the spare area are configured to replace the physical erasing units in the data area for writing data.

23. The memory storage apparatus of claim 22, wherein in the operation of selecting the first physical erasing unit from the physical erasing units by the memory controller, the memory controller is further configured to select the first physical erasing unit from the data area, wherein the valid data count of the first physical erasing unit is less than the valid data counts of other physical erasing units in the data area.

24. The memory storage apparatus of claim 23, wherein the memory controller is further configured to determine whether the number of the physical erasing units in the spare area is not greater than a predefined value,
if the number of the physical erasing units in the spare area is not greater than the predefined value, the memory controller selects the first physical erasing unit from the physical erasing units,
the memory controller loads the at least one first logical address-physical address mapping table among the logical address-physical address mapping tables from the rewritable non-volatile memory module according to the physical address-logical address mapping table,
the memory controller updates the at least one first logical address-physical address mapping table according to the physical address-logical address mapping table,
the memory controller identifies the valid data in the first physical erasing unit according to the physical address-logical address mapping table and the at least one first logical address-physical address mapping table,
the memory controller stores the at least one first logical address-physical address mapping table back to the rewritable non-volatile memory module,
the memory controller copies the identified valid data from the first physical erasing unit to the second physical erasing unit among the physical erasing units,
the memory controller performs the erasing operation to the first physical erasing unit,
if the number of the physical erasing units in the spare area is greater than the predefined value, the memory controller loads the at least one first logical address-physical address mapping table among the logical address-physical address mapping tables from the rewritable non-volatile memory module according to the physical address-logical address mapping table, the memory controller updates the at least one first logical address-physical address mapping table according to the physical address-logical address mapping table.

* * * * *